United States Patent
Tada et al.

(10) Patent No.: US 6,778,751 B2
(45) Date of Patent: Aug. 17, 2004

(54) OPTICAL MODULATOR AND PHOTONIC SEMICONDUCTOR DEVICE

(75) Inventors: Hitoshi Tada, Tokyo (JP); Kazuhisa Takagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 427 days.

(21) Appl. No.: 09/817,058

(22) Filed: Mar. 27, 2001

(65) Prior Publication Data

US 2002/0054724 A1 May 9, 2002

(30) Foreign Application Priority Data

Nov. 6, 2000 (JP) ........................................ 2000-337472

(51) Int. Cl.[7] .............................. G02B 6/10; G02B 6/12; G02F 1/035
(52) U.S. Cl. ............................... 385/131; 385/14; 385/2
(58) Field of Search ................... 385/1–3, 14, 131–132

(56) References Cited

U.S. PATENT DOCUMENTS

| | | | |
|---|---|---|---|
| 5,165,105 A | * 11/1992 | Haase et al. | 385/8 |
| 5,173,955 A | * 12/1992 | Yamanishi et al. | 385/6 |
| 5,270,532 A | * 12/1993 | Hietala et al. | 250/214.1 |
| 5,276,745 A | * 1/1994 | Revelli, Jr. | 385/14 |
| 5,339,370 A | * 8/1994 | Sano et al. | 385/2 |
| 5,838,870 A | * 11/1998 | Soref | 385/131 |
| 5,918,109 A | * 6/1999 | Koui | 438/31 |
| 6,222,951 B1 | * 4/2001 | Huang | 385/14 |
| 6,374,028 B2 | * 4/2002 | Yamada et al. | 385/131 |

FOREIGN PATENT DOCUMENTS

JP 3-263388 11/1991

* cited by examiner

Primary Examiner—Edward J. Glick
Assistant Examiner—Thomas R Artman
(74) Attorney, Agent, or Firm—Leydig, Voit & Mayer, Ltd.

(57) ABSTRACT

An optical waveguide ridge has a side with a flat portion extending uniformly from a top of the ridge to a surface of a semiconductor substrate, the flat portion being in contact with an exposed surface of the substrate. A p-type electrode extends from the top of the optical waveguide ridge downward in contact with a dielectric film on the flat portion of the optical waveguide ridge. The p-type electrode further extends over the dielectric film onto the exposed surface of the semiconductor substrate where an end of the electrode is a bonding pad.

15 Claims, 22 Drawing Sheets

OPTICAL MODULATOR AND PHOTONIC SEMICONDUCTOR DEVICE

BACKGROUND OF THE INVENTION

1. Field of the Invention

The present invention relates to an optical modulator, a method for fabricating that optical modulator, and a photonic semiconductor device. More particularly, the invention relates to an optical modulator used in optical communication, a method for fabricating that optical modulator, and a photonic semiconductor device that combines such optical modulators.

2. Description of the Related Art

In order to promote widespread use of public communication networks with optical fibers, it is important to boost the performance of semiconductor laser devices and enhance their yield for less costly fabrication. In particular, improving semiconductor laser performance necessarily involves modulating laser emissions at higher speed so as to deal with growing quantities of information. Optical communication over long distances is implemented by minimizing wave fluctuations during high-speed laser modulation, whereas conventional setups having an injected current varied in single-mode semiconductor laser for direct modulation tend to suffer a pronounced wavelength chirping caused by fluctuating densities of injected carriers. For that reason, the direct modulation scheme cannot be used in long-distance high-speed modulated data transmissions at 10 Gbps or higher.

For 10-Gbps optical data transmission systems, the direction modulation scheme is typically replaced by an external modulation setup. External modulation involves keeping a semiconductor laser device oscillated at a constant level and having the emitted laser pass through optical modulators capable of turning on and off light transmission with a minimum of wavelength chirping in order to achieve light modulation.

Optical modulators used by the external modulation method are called electro-absorption modulators, abbreviated to EAMs hereunder. EAMs having a single optical absorption layer absorb light through the use of the Franz-Keldysh effect, and EAMs with a multiple quantum-well structure absorb light through absorption spectrum variations based on the Stark effect. Laser absorbency of an optical modulator varies depending on a backward bias voltage applied to the modulator in question. For that reason, if a modulation signal voltage is applied to a high-frequency electrical circuit connected to an optical modulator, a laser beam that is modulated in intensity reflecting the signal voltage is emitted from an emission face of the optical modulator.

In the field of high-speed communications at 20 Gbps or higher of the next generation, ultra-high-speed semiconductor optical modulators are drawing attention because they have a low-chirping characteristic, are small in size, and operate on low voltages. Implementing such ultra-high-speed semiconductor optical modulators faces an important challenge: how to minimize the capacity of optical modulator elements.

FIG. 25 is a perspective view of a conventional optical modulator, and FIG. 26 is a cross-sectional view taken on line XXVI—XXVI across the optical modulator in FIG. 25. In FIGS. 25 and 26, reference numeral 200 stands for an optical modulator; 202 for an n-type InP substrate (n-type conductivity is denoted by a symbol "n-" and p-type conductivity by "p-" hereunder); 204 for an n-InP clad layer; 206 for an optical absorption layer; 208 for a p-InP clad layer; 210 for a p-InGaAs contact layer; 212 for a surface protective film such as an SiO2 film; 214 for a polyimide layer; 216 for a p-type ohmic electrode; 216a for a bonding pad; and 218 for an n-type ohmic electrode.

A method for fabricating conventional optical modulators is outlined below. FIGS. 27, 28 and 29 are cross-sectional views of an optical modulator fabricated in sequence. On the n-InP substrate 202, the n-InP clad layer 204, the optical absorption layer 206, p-InP clad layer 208, and p-InGaAs contact layer 210 are first formed by epitaxial growth. An insulating film such as an SiO2 film is then formed over the surface on which is provided a stripe-shaped mask pattern 220 measuring 2 to 3 microns ($\mu$m) wide (see FIG. 27).

With the mask pattern 220 used as a mask, dry etching is carried out to a depth beyond the optical absorption layer 206, illustratively 2 to 3 microns deep, so as to form a ridge 222 (see FIG. 28). The surface protective film 212 such as an SiO2 film is formed next. Polyimide 214 is applied over the film to flatten the surface. An opening 224 is formed on top of the ridge 222 for ohmic contact (see FIG. 29).

The p-type ohmic electrode 216 and n-type ohmic electrode 218 are then formed, which completes the optical modulator shown in FIGS. 25 and 26. The element capacity of the optical modulator 200 thus fabricated is given as a sum of the capacity of the optical absorption layer 206 and the capacity of the bonding pad 216a. Because the capacity of the optical absorption layer 206 is determined by the performance of modulator elements complying with the dynamic range and extinction characteristic of the optical modulator 200, the element capacity can only be reduced to a certain extent.

When the area for accommodating bonding wires is taken into consideration, the bonding pad 216a may be reduced in area to about 50 $\mu$m×50 $\mu$m at most; further reduction of the pad area is difficult to achieve. For that reason, the bonding pad 216a is formed on the surface of the insulating polyimide 214 in order to minimize the capacity of the bonding pad 216a.

However, optical modulators designed to execute modulation at speeds as high as 40 Gbps or more are required to have an element capacitance of 0.1 pf or less. In the conventional optical modulator structure, the element capacitance is reduced using a thicker polymide layer 214. This has posed a problem: the polymide layer 214 is difficult to form.

Japanese Patent Laid-open No. Hei 3-263388 discloses an optical modulator related to this invention. The disclosed optical modulator has a mesa stripe of a semiconductor multi-layer structure containing active layers, the mesa stripe being flanked by InP high-resistance layers. This optical modulator has its element capacity reduced by use of an air-bridge structure that connects the top of the mesa stripe with a bonding pad on a high-resistance semiconductor substrate. The disclosed optical modulator has a ridge structure different from that of the optical modulator of the invention, to be described below.

SUMMARY OF THE INVENTION

The present invention has been made in view of the above circumstances, and a first object of the invention is to provide an optical modulator offering excellent high-frequency performance while being lowered in element capacity.

According to one aspect of the invention, there is provided an optical modulator comprising: a semi-insulating semiconductor substrate with a principal plane partially including an exposed surface; an optical waveguide ridge which is disposed on said semiconductor substrate and which includes a first clad layer of a first conductivity type, an optical-absorption layer, and a second clad layer of a second conductivity type, said optical waveguide ridge further having a side with a flat portion extending uniformly from a top of the ridge to said semiconductor substrate, the flat portion being in contact with the exposed surface of said semiconductor substrate; a dielectric film which covers said optical waveguide ridge and said semiconductor substrate and which has a first opening made at the top of said optical waveguide ridge and a second opening made in a region of said semiconductor substrate other than the exposed surface; a first electrode disposed on said dielectric film and mounted through said first opening on the top of said optical waveguide ridge, said first electrode further extending on the flat portion of said optical waveguide ridge while in close contact with a surface of said dielectric film, said first electrode further having one end thereof established on said semiconductor substrate through the exposed surface thereof; and a second electrode disposed on said semiconductor substrate and connected to the first clad layer through the second opening of said dielectric film.

Accordingly, the inventive structure reduces the capacity of the bonding pad of the first electrode, whereby an optical modulator of excellent high-speed performance is constituted.

Anther object of the invention is to provide a photonic semiconductor device comprising optical modulators of advanced high-frequency performance.

According to another aspect of the invention, there is provided a photonic semiconductor device comprising: an optical modulator having; a semi-insulating semiconductor substrate with a principal plane partially including an exposed surface, an optical waveguide ridge which is disposed on the semiconductor substrate and which includes a first clad layer of a first conductivity type, an optical-absorption layer, and a second clad layer of a second conductivity type, the optical waveguide ridge further having a side with a flat portion extending uniformly from a top of the ridge to said semiconductor substrate, the flat portion being in contact with the exposed surface of the semiconductor substrate, a dielectric film which covers the optical waveguide ridge and the semiconductor substrate and which has a first opening made at the top of the optical waveguide ridge and a second opening made in a region of the semiconductor substrate other than the exposed surface, a first electrode disposed on the dielectric film and mounted through the first opening on the top of the optical waveguide ridge, the first electrode further extending on the flat portion of the optical waveguide ridge while in close contact with a surface of the dielectric film, the first electrode further having one end thereof established on the semiconductor substrate through the exposed surface thereof, and a second electrode disposed on said semiconductor substrate and connected to the first clad layer through the second opening of the dielectric; and a semiconductor laser device aligned in optical axis with the optical absorption layer of the optical modulator.

Accordingly, the invention thus provides a photonic semiconductor device of outstanding high-frequency characteristics.

A further object of the present invention is to provide a method of simplified steps for fabricating an optical modulator offering enhanced high-frequency performance with a small element capacity.

According to a further aspect of the invention, there is provided an optical modulator fabricating method comprising the steps of: forming firstly a first clad layer of a first conductivity type, an optical absorption layer, and a second clad layer of a second conductivity type on a semi-insulating semiconductor substrate; forming secondly by photolithograpy and etching an exposed surface of the semiconductor substrate as well as an optical waveguide ridge which has a side with a flat portion stretching uniformly from a top of the ridge to the semiconductor substrate, the flat portion being brought into contact with the exposed surface of the semiconductor substrate; forming thirdly a dielectric film over the semiconductor substrate and a first and a second opening through the film, the first opening being made at the top of the optical waveguide ridge, the second opening being made in a region of the semiconductor substrate excluding the exposed surface thereof; forming fourthly a first electrode through the first opening on the top of the optical waveguide ridge in such a manner that the first electrode extends along the flat portion of the optical waveguide ridge while in close contact with a surface of the dielectric film, the first electrode further having one end thereof formed on the semiconductor substrate through the exposed surface thereof; and forming fifthly a second electrode connected to the first clad layer through the second opening of the dielectric film.

Accordingly, the inventive method permits fabricating an optical modulator of a reduced element capacity using simplified steps, whereby an inexpensive optical modulator of excellent high-speed characteristics is provided.

Other objects and advantages of the invention will become apparent from the detailed description given hereinafter. It should be understood, however, that the detailed description and specific embodiments are given by way of illustration only since various changes and modifications within the scope of the invention will become apparent to those skilled in the art from this detailed description.

Other features and advantages of the invention will be apparent from the following description taken in connection with the accompanying drawings.

BRIEF DESCRIPTION OF THE DRAWINGS

In all figures, the substantially same elements are given the same reference number.

DESCRIPTION OF THE PREFERRED EMBODIMENT

First Embodiment

The first embodiment of this invention is formed by having a flat portions furnished uniformly on a side of an optical waveguide ridge and stretching from the ridge top to the semiconductor substrate surface, the flat portion further coming into contact with an exposed substrate surface. In between a dielectric film covering the optical waveguide ridge, a first electrode is laid out in close contact with the dielectric film on the flat portion and is extended downward from its top. The first electrode is further extended onto the exposed semiconductor substrate surface where an end of the electrode is established on the dielectric film.

Figure 1:
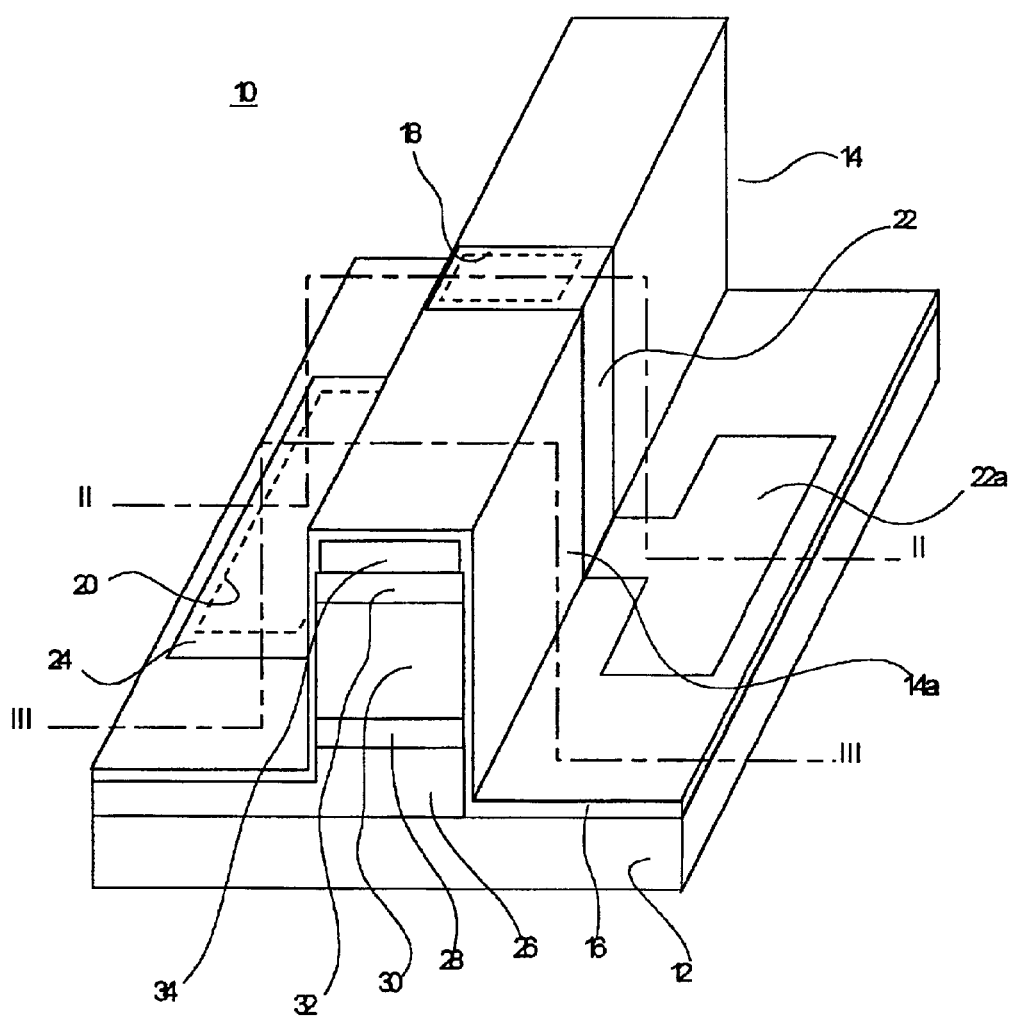
FIG. 1 is a perspective view of an optical modulator practiced as a first embodiment of the invention.

FIG. 1 is a perspective view of an optical modulator practiced as the first embodiment of this invention. In FIG. 1, reference numeral 10 stands for an optical modulator; 12 for a semi-insulating InP substrate serving as a semiconductor substrate; 14 for an optical waveguide ridge; and 16 for a surface protective film made of an SiO2 film as a dielectric film covering the optical waveguide ridge 14 and semiconductor substrate 12. Reference numerals 18 and 20 denote a first and a second opening on the surface protective film respectively. Reference numeral 22 represents a p-type electrode acting as the first electrode, and 24 stands for an n-type electrode serving as a second electrode that doubles as a bonding pad. The p-type electrode 22 and n-type electrode 24 are furnished on the surface protective film 16 through the openings 18 and 20.

Figure 2:
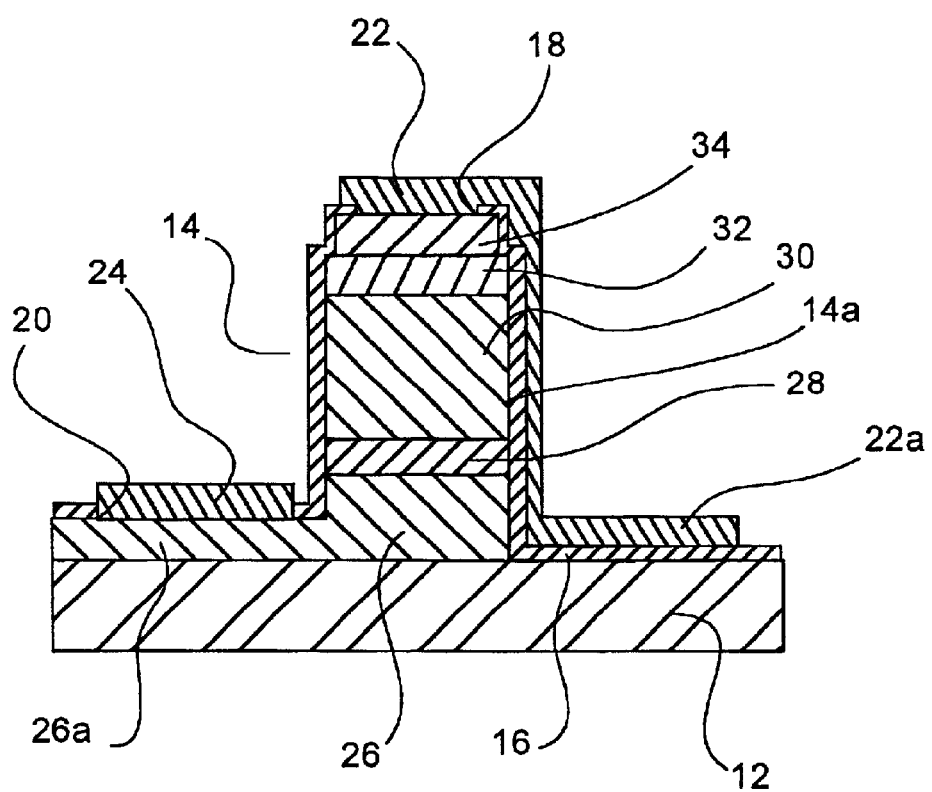
FIG. 2 is a cross-sectional view of the first embodiment.
Figure 3:
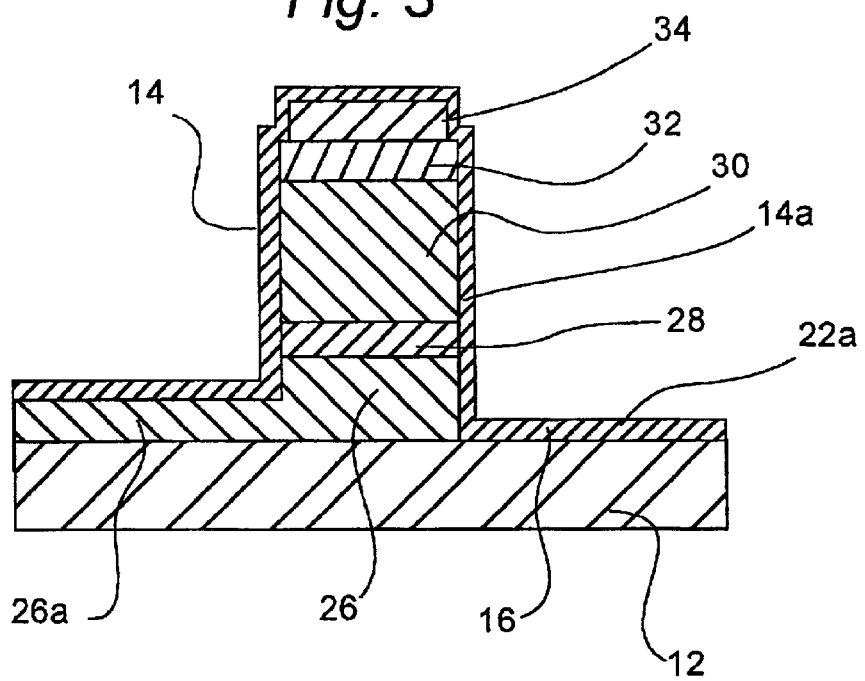
FIG. 3 is another cross-sectional view of the first embodiment.

FIG. 2 is a cross-sectional view taken on line II—II across the optical modulator in FIG. 1, and FIG. 3 is a cross-sectional view taken on line III—III across the same optical modulator. In FIG. 2, reference numeral 26 denotes an n-type clad layer serving as a first clad layer on the InP substrate 12. The n-type clad layer 26 is made of n-InP.

An extension 26a of the n-type clad layer 26 stretches beyond one side of the optical waveguide ridge 14. An optical absorption layer 28 formed on the n-type clad layer 26 has an MQW structure made of InGaAsP/InGaAs(P) materials. Alternatively, the MQW structure may be constituted by InGaAlAs/InAlAs materials.

Reference numeral 30 stands for a p-type clad layer serving as a second clad layer made of p-InP over the optical absorption layer 28; 32 denotes a contact layer made of p-InGaAs on the p-type clad layer 30; and 34 represents a foundation electrode layer with Ti, Pt and Au layers accumulated from a contact layer 32 upward.

The optical waveguide ridge 14 is constituted by the n-type clad layer 26, the optical absorption layer 28, the p-type clad layer 30, the contact layer 32, and the foundation electrode layer 34. One side of the optical waveguide ridge 14 has its base in contact with the extension 26a of the n-type clad layer 26, and the other side has its base contacting the InP substrate 12. Part of the side in contact with the InP substrate 12 has a uniformly flat portion 14a which is wider than the p-type electrode 22 and which stretches from the contact layer 32 to the surface of the InP substrate 12. Over the flat portion 14a, the n-type clad layer 26 has no staggers projecting laterally from the optical waveguide ridge 14.

Part of the p-type electrode 22 is mounted through the opening 18 on the foundation metal layer 34 over the top surface of the optical waveguide ridge 14, whereby the electrode 22 is electrically connected to the layer 34. The p-type electrode 22 is in close contact with the surface protective film 16 while stretching from the top of the optical waveguide ridge 14 to its base over the lateral flat portion 14a. The p-type electrode 22 further extends over the InP substrate 12 while in close contact with the surface protective film 16, so that an end of the electrode 22 forms a bonding pad 22a on the exposed surface of the InP substrate 12 with the surface protective film 16 interposed therebetween.

The p-type electrode 22 is made of Ti and Au layers accumulated from the foundation metal layer 34 upward. The electrode 22 may be plated with an Au layer where necessary. Alternatively, the p-type electrode 22 may be mounted directly on the contact layer without the intervening presence of a foundation metal layer 34.

The surface of the extension 26a of the n-type clad layer 26 is covered with the surface protective film 16. The n-type electrode 24 is formed on the extension 26a through the opening 20 to ensure electrical connection with the n-type clad layer 26.

The cross-section in FIG. 3 is roughly the same as that in FIG. 2; the difference is that in FIG. 3, the foundation metal layer 34 on the top surface of the optical waveguide ridge 14 is covered with the surface protective film 16 and that there are neither the openings 18 and 20 nor the p-type and n-type electrodes 22 and 24.

An inventive method for fabricating the optical modulator 10 will now be described. FIGS. 4, 5, 6 and 7 are cross-sectional views of an optical modulator element as fabricated in different steps.

On the semi-insulating InP substrate 12, there are formed by epitaxial growth an n-InP layer constituting the n-type clad layer 26, the optical absorption layer 28 having the MQW structure made of InGaAsP/InGaAs(P) materials, a p-InP layer forming the p-type clad layer 30, and a p-InGaAs layer serving as the contact layer 32.

A coat of resist is applied onto the whole surface. By a process of photolithography, a resist pattern 38 is formed having a stripe-shaped opening 2 to 3 microns wide in the direction of the optical waveguide. On the resist pattern 38, Ti, Pt and Au layers are deposited by sputtering to form the foundation electrode layer 34 (see FIG. 4).

The resist pattern 38 is removed by the lift-off method in a manner leaving the stripe-shaped foundation electrode layer 34 intact. A dielectric film such as an SiO2 film is formed to cover the stripe-shaped foundation electrode layer 34. While the pattern of the stripe-shaped dielectric film 40 including the foundation electrode layer 34 is left intact, the remaining portions are removed by etching. With the dielectric film 40 used as a ridge-forming mask, the layers are removed by dry etching beyond the optical absorption layer 28 and until the n-type clad layer 26 is exposed (see FIG. 5).

That portion of the exposed n-type clad layer 26 which is located on one side of the ridge is removed by etching. The process forms, on one side of the ridge, the optical waveguide ridge 14 having the uniformly flat portion 14a stretching from the contact layer 32 to the surface of the IpP substrate 12.

Figure 6:
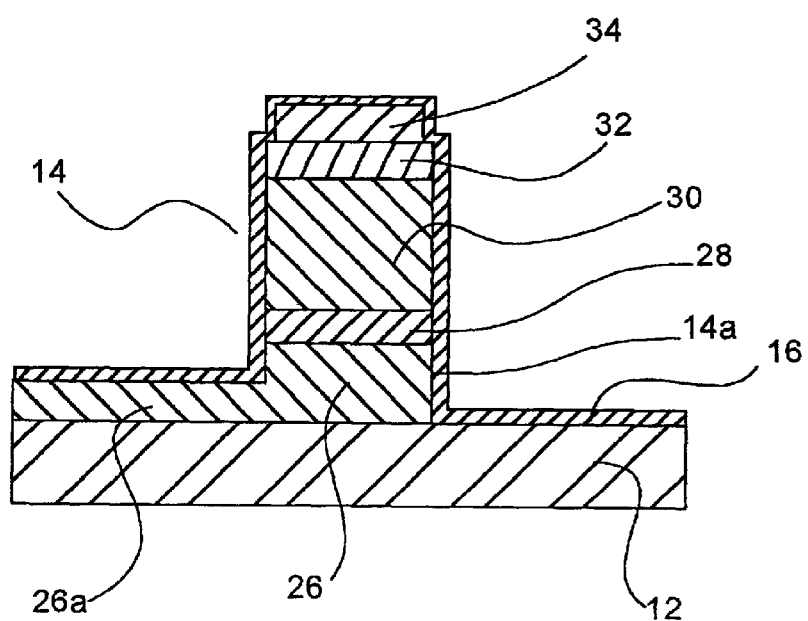
FIG. 6 is a cross-sectional view of the inventive optical modulator element as fabricated in another step.

An SiO2 film constituting the surface protective film 16 is then formed over the extension 26a of the n-type clad layer 26, optical waveguide ridge 14, and InP substrate 12 (see FIG. 6). The surface protective film 16 may be formed alternatively by an SiN film.

Figure 7:
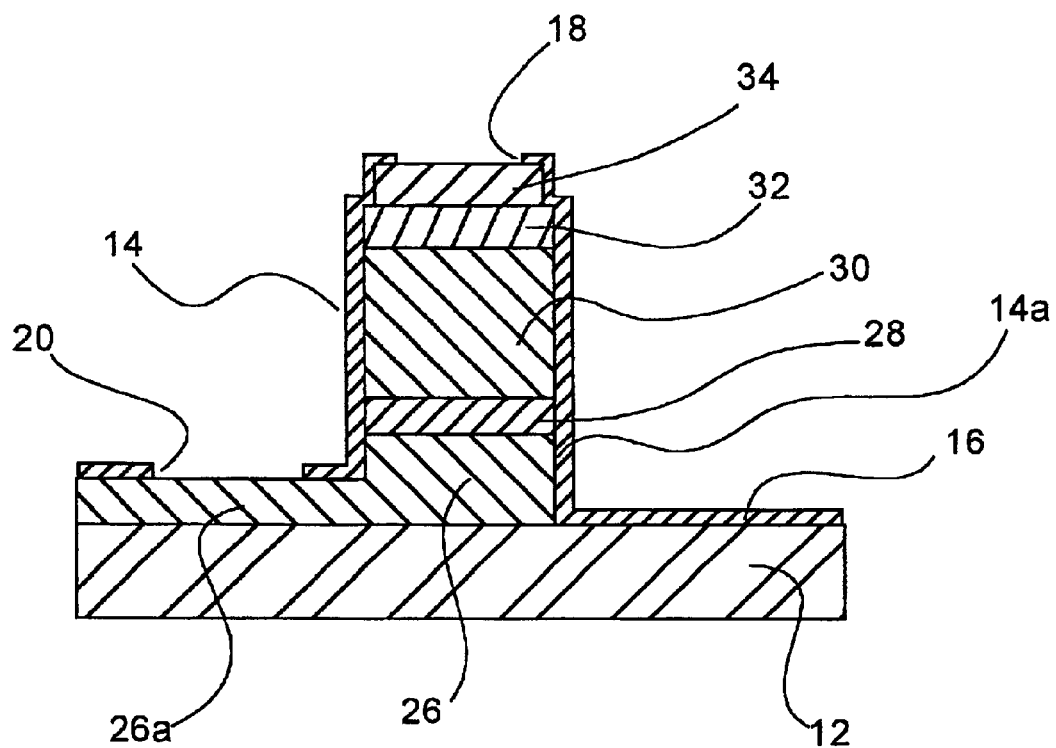
FIG. 7 is a cross-sectional view of the inventive optical modulator element as fabricated in another step.

Through the surface protective film 16, the opening 18 is formed on top of the optical waveguide ridge 16 and the opening 20 on the extension 26a of the n-type clad layer 26 (see FIG. 7). Thereafter, a coat of resist is applied onto the surface protective film 16. A resist pattern is formed by removing the resist from a region covering the opening 20 as well as from a region that stretches from the top surface of the optical waveguide ridge 14 covering the opening 18 to the base of the ridge 14 by way of the lateral flat portion 14a and which extends further onto the exposed surface of the InP substrate 12. All over the surface, a Ti film and an Au film are deposited as electrode layers by sputtering. By use of the lift-off method, the resist pattern and the electrode layers formed thereon are removed.

The steps above form the p-type electrode 22 which connects to the foundation electrode layer 34 through the opening 18, which stretches over the lateral flat portion 14a from the top surface of the optical waveguide ridge 14 to its bottom while in close contact with the surface protective film 16, and which extends further over the surface protective film 16 to the exposed surface of the InP substrate 12 where an end of the electrode 22 is formed as the bonding pad 22a.

The same steps fabricate the n-type electrode 24, one end of which is formed as a bonding pad in the region that includes the opening 20. The InP substrate 12 is then ground to a thickness of 100 $\mu$m, which completes the optical modulator element shown in FIGS. 1, 2 and 3.

Figure 4:
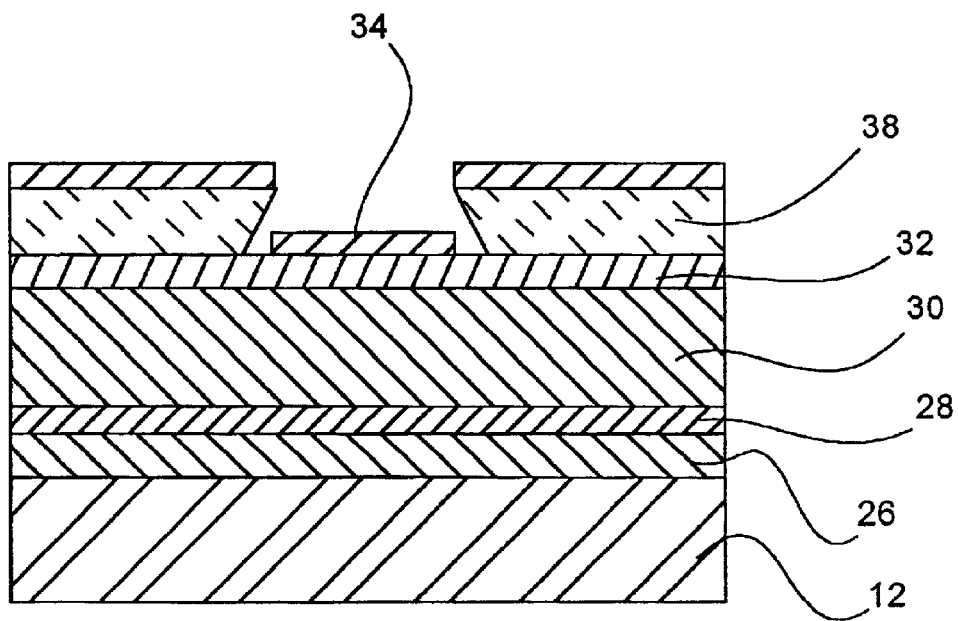
FIG. 4 is a cross-sectional view of an optical modulator element in the first embodiment as fabricated in one step.
Figure 5:
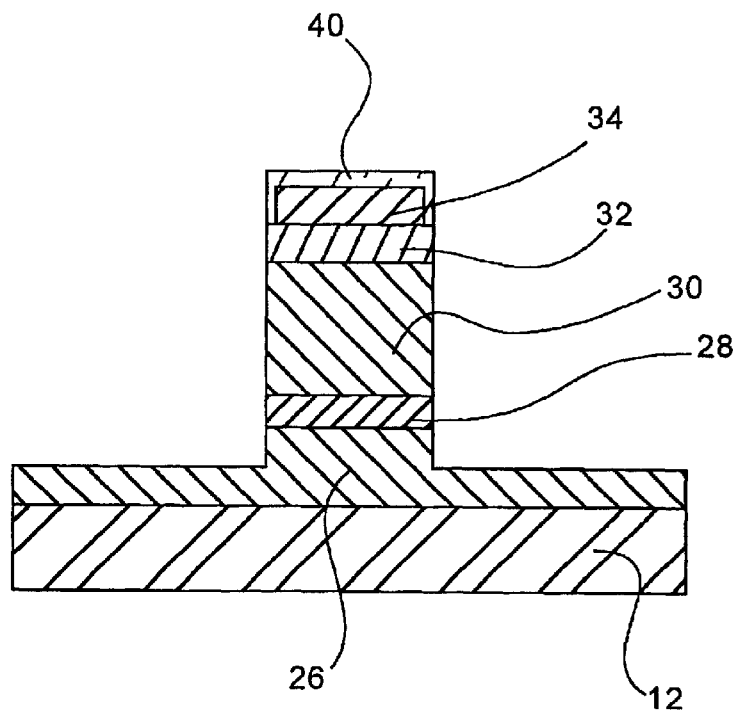
FIG. 5 is a cross-sectional view of the inventive optical modulator element as fabricated in another step.

According to the fabrication method above, the stripe-shaped foundation electrode layer 34 is formed over the epitaxial growth layers (FIG. 4). The foundation electrode layer 34 is then covered with the dielectric film that is used as the ridge-forming mask. With the mask in place, the remaining portions are removed by dry etching to form the ridge (FIG. 5). Alternatively, the optical modulator element may be fabricated as follows:

After epitaxial growth of layers, a stripe-shaped pattern of a dielectric film is formed. The stripe-shaped pattern is used as a mask in dry etching whereby a ridge is formed. An n-type clad layer on one side of the ridge is then removed. This forms the optical waveguide ridge 14 having a uniformly flat portion 14a stretching over one side of the ridge from a contact layer 32 to the surface of an InP substrate 12. With the stripe-shaped pattern then removed, a foundation electrode layer 34 is formed by the lift-off method at the top of the ridge. Thereafter, an SiO2 film is formed as a surface protective film 16 on an extension 26a of an n-type clad layer 26, on the optical waveguide ridge 14, and on the InP substrate 12 (see FIG. 6).

What follows is a description of how the first embodiment of the invention works. An external optical system (not shown) inputs a laser beam to the optical modulator 10. The laser beam is entered into one edge of the optical absorption layer 28.

A signal line (not shown) from external wiring (not shown) is connected to the bonding pad 22a of the p-type electrode 22 in the optical modulator 10, and a ground line (not shown) is connected to the n-type electrode 24. A modulation signal is input through the signal line to the p-type electrode 22. Having reached the p-type electrode 22, the electrical signal appears as a modulation signal voltage between the p-type clad layer 30 of the optical modulator 14 and the n-type clad layer 26 on the ground side. The modulation signal voltage is supplied to the optical absorption layer 28. The laser beam input to one face of the optical absorption layer 28 is modulated as it is turned on and off in keeping with the modulation signal voltage.

The modulated laser beam is output from another face of the optical absorption layer 28. The modulated laser beam is guided through a lens system to optical fibers for transmission to the external optical system.

The optical modulator 10 of the first embodiment has no polyimide layers on both sides of the optical waveguide ridge 14. The optical waveguide ridge 14 is laterally covered with the surface protective film 16. The p-type electrode 22 is in close contact with the surface protective film 16 while extending over the lateral flat portion 14a from the top of the optical waveguide ridge 14 to its base. The p-type electrode 22 further extends in close contact with the surface protective film 16 onto the exposed surface of the InP substrate 12 where an end of the electrode 22 is formed as the bonding pad 22a.

The p-type electrode 22 thus structured has two parts each possessing a capacity as a pole plate: (1) the bonding pad 22a, and (2) that side of the n-type clad layer 26 which is positioned opposite to the p-type electrode across the surface protective film 16.

If it is assumed that the InP substrate is about 100 $\mu$m thick and that the bonding pad 22a measures 50 $\mu$m×50 $\mu$m, then the bonding pad 22a has a capacity of 3 fF (fF=10$^{-15}$F) or thereabout. Suppose now that the n-type clad layer 26 is 1 $\mu$m thick, that the p-type electrode 22 is 10 $\mu$m wide, and that the surface protective film 16 is 0.2 $\mu$m in thickness. In that case, that side of the n-type layer 26, which is positioned opposite to the p-type electrode 22 across the surface protective film 16, has a capacity of about 5 fF. The combined capacity thus amounts approximately to 8 fF.

In a comparable conventional optical modulator structure where a practically usable polyimide layer has a thickness of 3 μm with the bonding pad of 50 μm×50 μm formed thereon, the capacity of the bonding pad is about 30 fF. That means the optical modulator of the first embodiment has its element capacity reduced to about one-fourth of that of the comparable conventional optical modulator. Because the p-type electrode 22 is formed in close contact with the surface protective film furnished laterally over the optical waveguide ridge 14, the inventive optical modulator has a simpler structure and is easer to fabricate than before.

Variations

Figure 8:
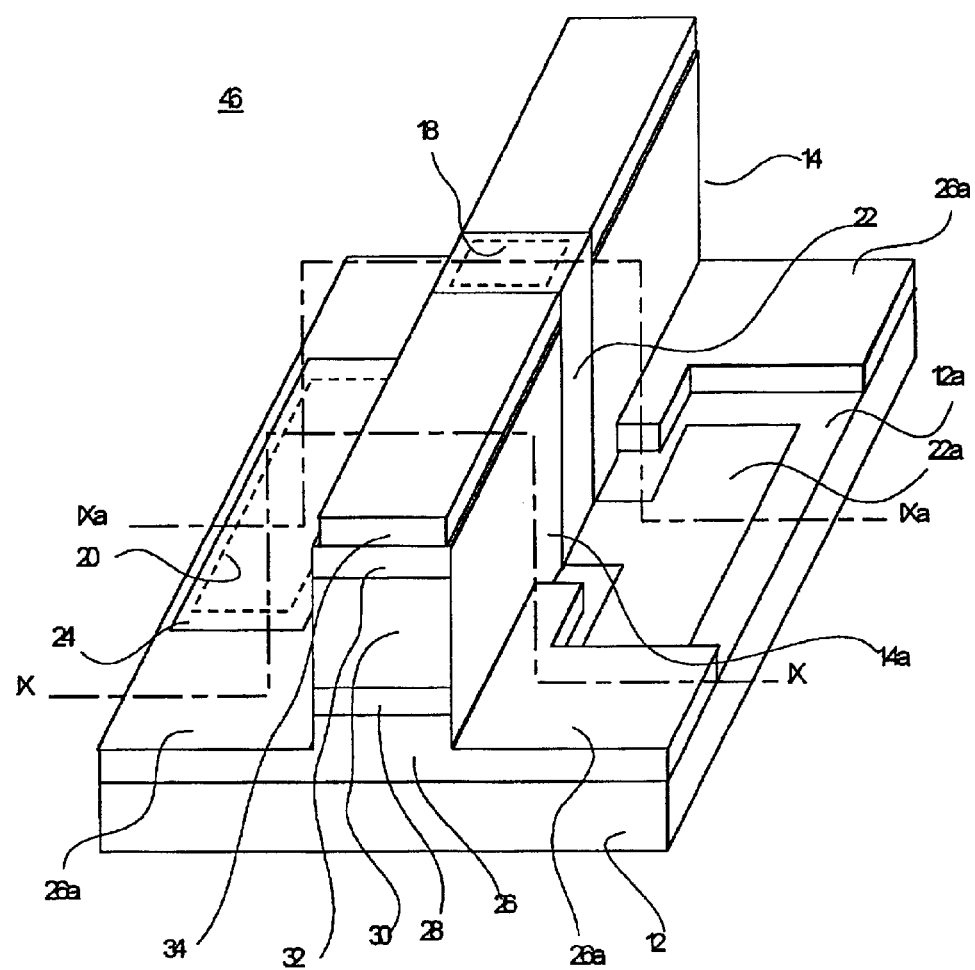
FIG. 8 is a perspective view of one variation of the first embodiment.
Figure 9:
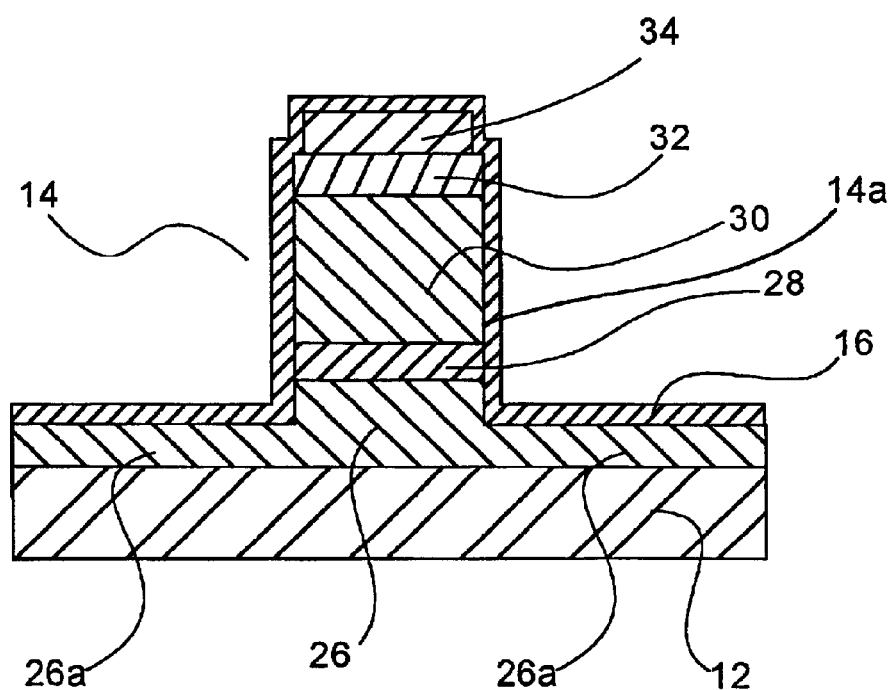
FIG. 9 is a cross-sectional view of the variation of the first embodiment.

FIG. 8 is a perspective view of one variation of the optical modulator 10. FIG. 9 is a cross-sectional view taken on line IX—IX across the optical modulator in FIG. 8. The cross-section taken on line IXa—IXa in FIG. 8 is the same as that in FIG. 2.

Although not shown explicitly as with the surface protective film 16 in FIG. 1, a surface oxide film 16 is assumed to exist in FIG. 8 over the entire element under a p-type electrode 22 and an n-type electrode 24 except where they are in contact with lower layers through openings 18 and 20. The same holds for structures shown in FIGS. 10, 11, 13, 23 and 24.

In FIG. 8, reference numeral 46 denotes an optical modulator, and 12a represents an exposed surface of an InP substrate 12. In the optical modulator 10, the extension 26a of the n-type clad layer 26 was shown extending only over one external side of the optical waveguide ridge 14. In the optical modulator 26, by contrast, the extension 26a of the n-type clad layer 26 extends over both external sides of the optical waveguide ridge 14.

The extension 26a of the n-type clad layer 26 does not grow in capacity as long as it is not located in a region where the p-type electrode 22 is formed. Thus the extension 26a may stretch over that portion of the semiconductor substrate on which the n-type clad layer 26 is furnished. Unlike in the case where the n-type clad layer 26 is completely removed, a somewhat coarse mask alignment is tolerated provided no interference occurs in the region where the p-type electrode 22 is formed.

Figure 10:
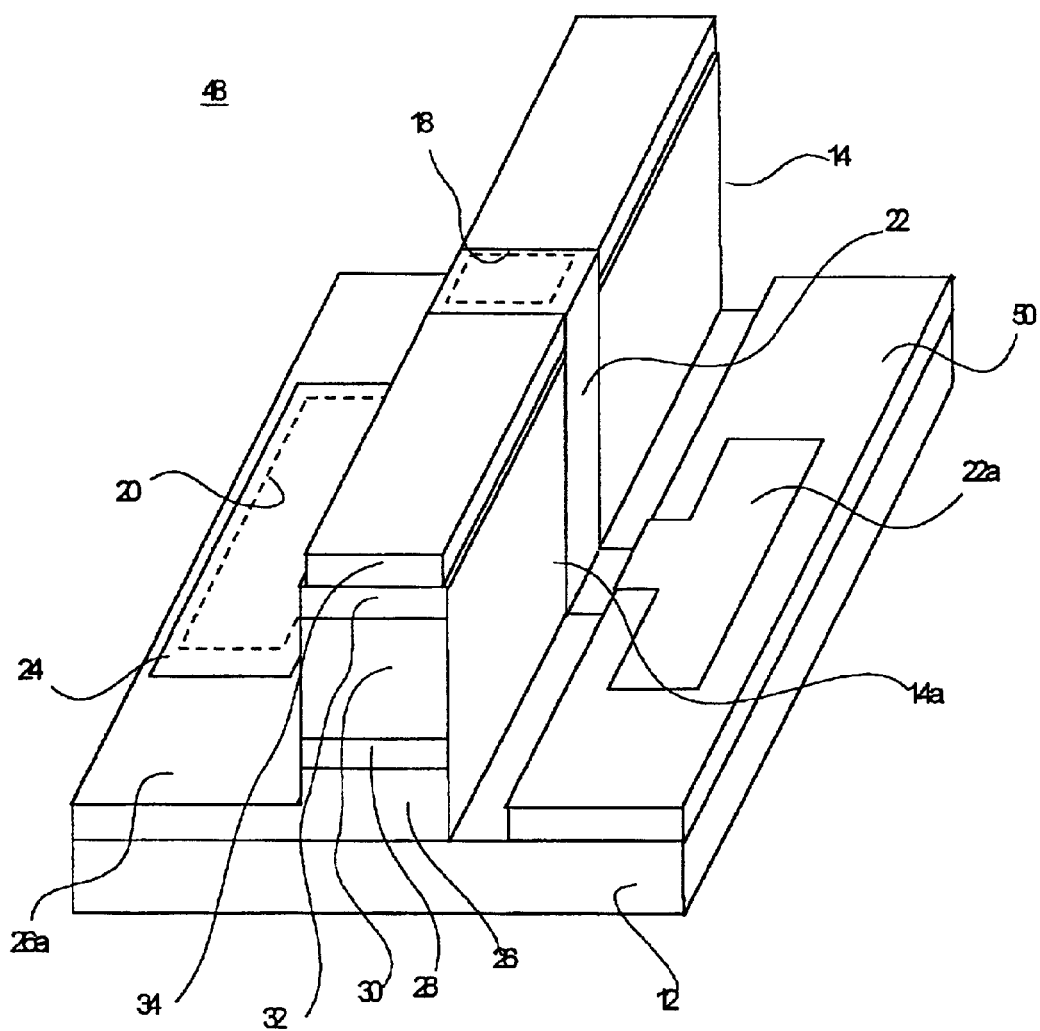
FIG. 10 is a perspective view of another variation of the first embodiment.

FIG. 10 is a perspective view of another variation of the optical modulator 10. In FIG. 10, reference numeral 48 stands for an optical modulator, and 50 for an n-InP layer. In the optical modulator 48, the removal of part of the n-type clad layer 26 may leave intact the n-InP layer 50 over the InP substrate 12 as long as the n-InP layer 50 is not electrically connected to the n-type clad layer 26 of the optical waveguide ridge 14. The p-type electrode 22 may be formed on the n-InP layer 50.

Second Embodiment

The second embodiment of this invention is formed by exposing a semiconductor substrate on both sides of an optical waveguide ridge and by having uniformly flat portions extended from the top of the ridge over both sides down to the surface of the semiconductor substrate. Each of the flat portions is arranged to come into contact with the exposed surface of the semiconductor substrate. Over a dielectric film covering the optical waveguide ridge, a first electrode is laid out in close contact with the dielectric film over the flat portions on both sides of the ridge and extending downward from the top of the ridge. The first electrode is further extended onto the exposed semiconductor substrate surfaces so that ends of the electrode are established on both sides of the optical waveguide ridge.

Figure 11:
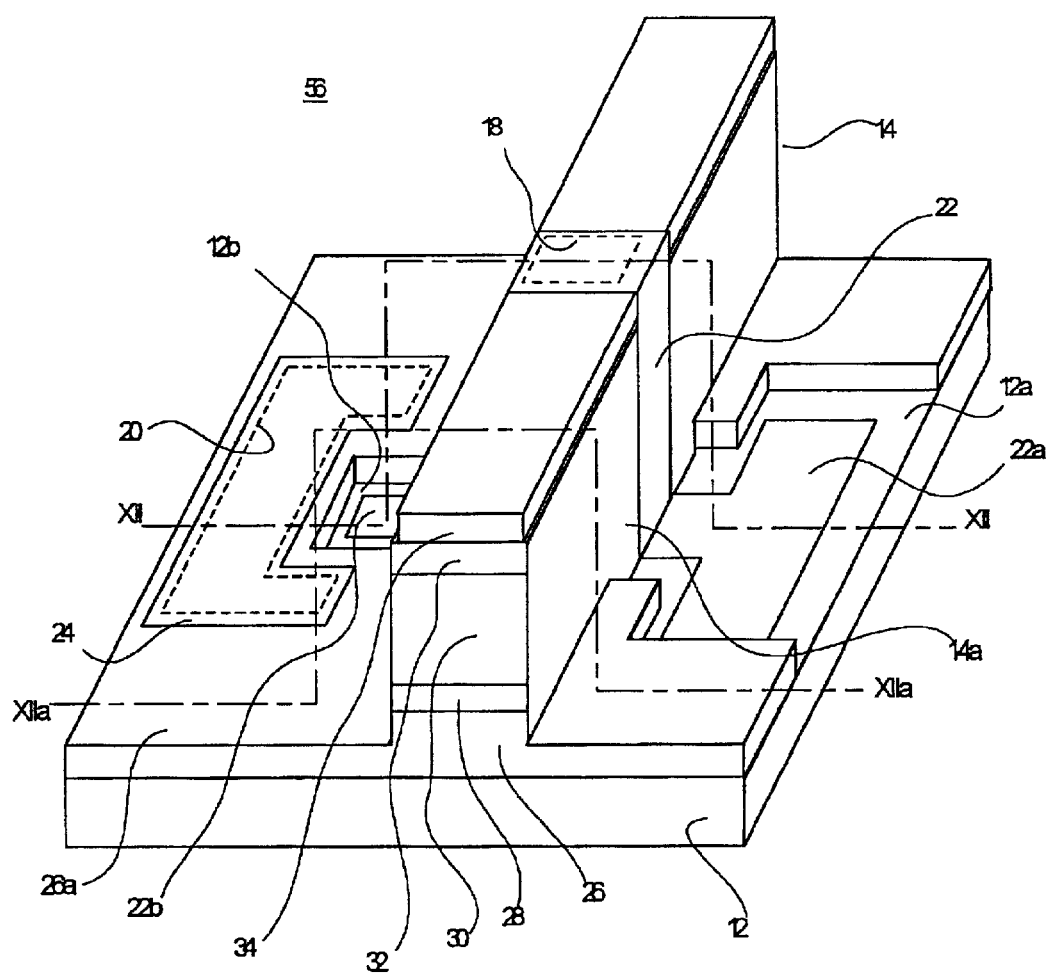
FIG. 11 is a perspective view of an optical modulator practiced as a second embodiment of the invention.
Figure 12:
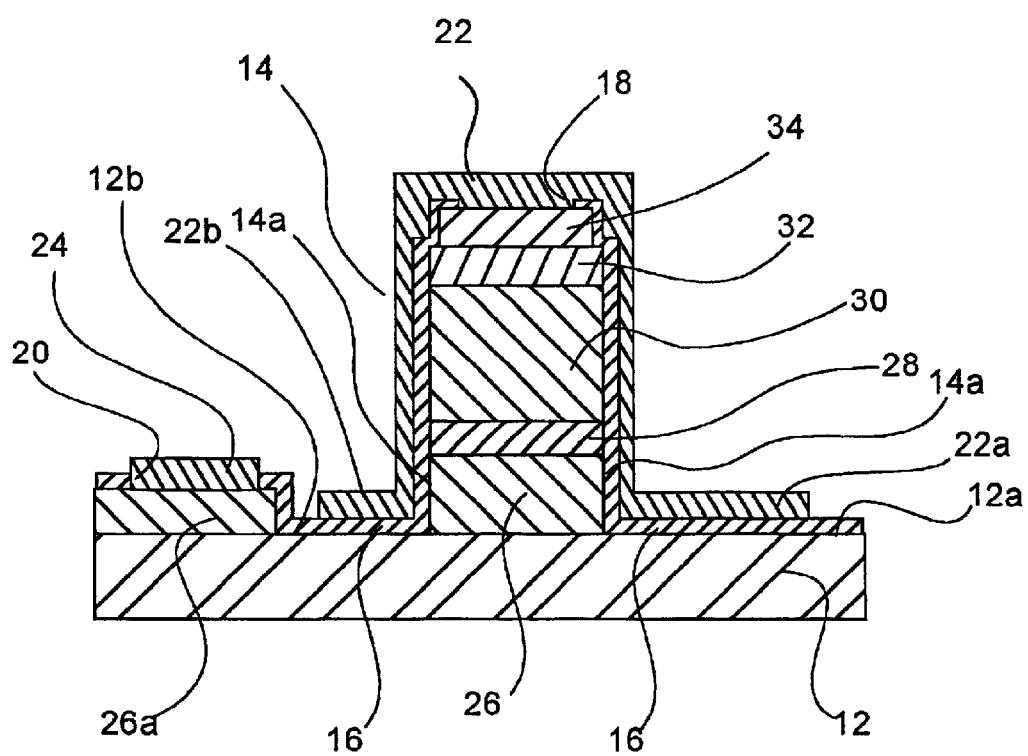
FIG. 12 is a cross-sectional view of the second embodiment.

FIG. 11 is a perspective view of an optical modulator practiced as the second embodiment of the invention. FIG. 12 is a cross-sectional view taken on line XII—XII across the optical modulator in FIG. 11. The cross-section taken on line XIIa—XIIa in FIG. 11 is the same as that in FIG. 9. In FIG. 11, reference numeral 56 stands for an optical modulator; 12a for an exposed substrate surface where a bonding pad 22a of a p-type electrode is furnished; and 12b for an exposed substrate surface where another end 22b of the p-type electrode is provided.

In FIGS. 11 and 12, an optical waveguide ridge 14 comprises over part of its two sides flat portions 14a that extend in a uniformly flat manner from a contact layer 32 to the surface of an InP substrate 12. The flat portions 14a are in contact with the exposed substrate surfaces 12a and 12b at the base of the optical waveguide ridge 14.

On the top surface of the optical waveguide ridge 14, the p-type electrode 22 is connected through an opening 18 to a foundation metal layer 34. Over a surface protective film 16 and along the flat portions 14a on both sides of the optical waveguide ridge 14, the p-type electrode 22 is extended to the base of the ridge 14. On one side of the ridge 14, the p-type electrode 22 is extended over the surface protective film 16 and on to the exposed substrate surface 12a where the bonding pad 22a is formed. On the other side of the ridge 14, the p-type electrode 22 has its end 22b established on the exposed substrate surface 12b.

The steps for fabricating the optical modulator 56 are the same as those for fabricating the optical modulator of the first embodiment, up to the process of etching whereby the n-type clad layer 26 is exposed (see FIG. 5).

In forming the optical waveguide ridge 14, part of the exposed n-type clad layer 26 is removed by etching from both sides of the ridge 14. This produces the uniformly flat portions 14a over part of the two lateral regions of the ridge ranging from the contact layer 32 to the surface of the InP substrate 12. At the same time, those exposed surfaces 12a and 12b of the InP substrate, which are in contact with the flat portions 14a, are formed on both sides of the ridge 14.

Thereafter, a SiO2 film serving as the surface protective film 16 is formed on an extension 26a of the n-type clad layer 26, on the optical waveguide ridge 14 and on the InP substrate 12. Openings 18 and 20 are formed through the surface protective film 16 at the top of the optical waveguide ridge 14 as well as on the extension 26a of the n-type clad layer 26.

A coat of resist is then applied onto the surface protective film 16. A resist pattern is formed by removing the resist from a region covering the opening 20 as well as from a region that stretches from the top surface of the optical waveguide ridge 14 covering the opening 18 to the base of the ridge 14 by way of the two lateral flat portions 14a and which extends further onto the exposed surfaces 12a and 12b of the InP substrate 12 on both sides of the ridge 14.

All over the surface, a Ti film and an Au film are deposited as electrode layers by sputtering. By use of the lift-off method, the resist pattern and the electrode layers formed thereon are removed.

The steps above form the p-type electrode 22 which connects to the foundation electrode layer 34 through the opening 18, which stretches over the two lateral flat portions 14a from the top surface of the optical waveguide ridge 14 to its bottom while in close contact with the surface protective film 16, and which extends further over the surface protective film 16 to the exposed surfaces 12a and 12b of the InP substrate 12 where one end of the electrode 22 is established as the bonding pad 22a and the other end as the end 22b. The same steps fabricate an n-type electrode 24, one end of which is formed as a bonding pad in the region that includes the opening 20.

The InP substrate 12 is then ground to a thickness of 100 μm, which completes the optical modulator element shown in FIGS. 11 and 12.

According to the fabrication method above, the exposed surfaces 12a and 12b of the InP substrate 12 are formed on both sides of the optical waveguide ridge 14. The p-type electrode 22 is stretched over both sides of the ridge 14 so that one end of the electrode is formed in the exposed surface 12a and the other end in the exposed surface 12b on the InP substrate 12. In this structure, the optical modulator does not grow in element capacity even if mask alignment for fabricating the p-type electrode 22 is not too strict. With element capacity variations thus reduced, the yield of optical modulator production is improved.

Functionally, it is sufficient for one end of the p-type electrode 22 to be connected through the opening 18 at the top of the optical waveguide ridge 14 to the foundation electrode layer 34 and for the other end of the p-type electrode 22 to be formed as the bonding pad 22a on the exposed surface of the InP substrate 12. To form the p-type electrode only on one side of the optical waveguide ridge 14, however, requires boosting the accuracy of mask alignment. Conventionally, it has often happened that where the p-type electrode 22 is formed on both sides of the optical waveguide ridge 14, one end of the electrode 22 is formed as the bonding pad 22a over the surface protective film 16 on the exposed surface of the InP substrate 12 while the other end of the electrode 22 is produced unexpectedly on the extension 26a of the n-type clad layer 26 over the surface protective film 16. This constitutes a capacitor wherein pole plates are positioned opposite each other across the thin surface protective film 16. The structure, prone to fall short of capacity requirements, has often resulted in pronounced element capacity variations from one optical modulator to another. The tendency has contributed to lowering the yield of optical modulator fabrication.

In the optical modulator 56 of the second embodiment, the other end 22b of the electrode 22, i.e., not the bonding pad 22a, is formed on the exposed surface 12b of the InP substrate 12. This arrangement reduces the capacity of the end 22b. With the element capacity thus kept from growing, element capacity variations are minimized and the yield of optical modulator production is improved correspondingly. Because mask alignment is easy to conduct, the fabrication steps involved are simplified. That in turn translates into a lowered manufacturing cost of the optical modulator.

Third Embodiment

The third embodiment of this invention is formed by first having part of a semiconductor substrate furrowed by etching prior to epitaxial growth for fabricating an optical waveguide ridge. A conductive layer is buried in the furrowed region. On part of the conductive layer, an optical waveguide ridge is formed by epitaxial growth. A bonding pad of a p-type electrode is formed on an exposed surface of the semiconductor substrate, and an n-type electrode is formed on the conductive layer.

Figure 13:
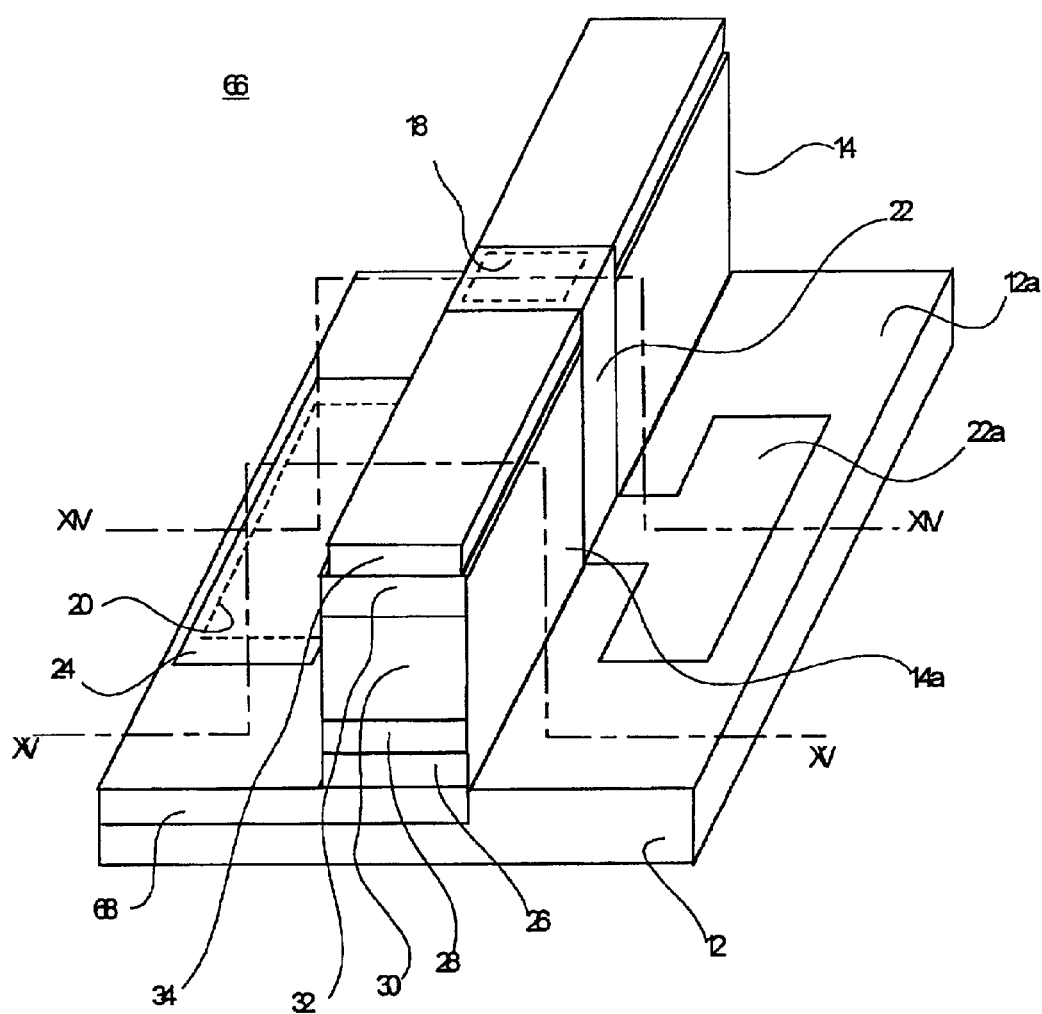
FIG. 13 is a perspective view of an optical modulator practiced as a third embodiment of the invention.
Figure 14:
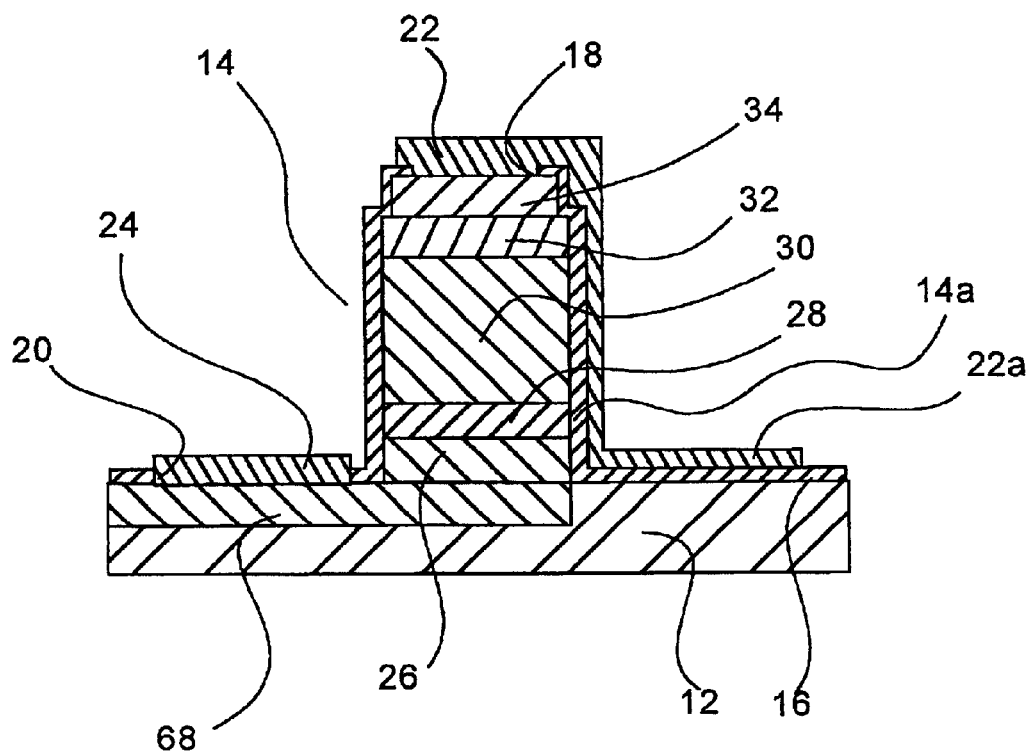
FIG. 14 is a cross-sectional view of the third embodiment.
Figure 15:
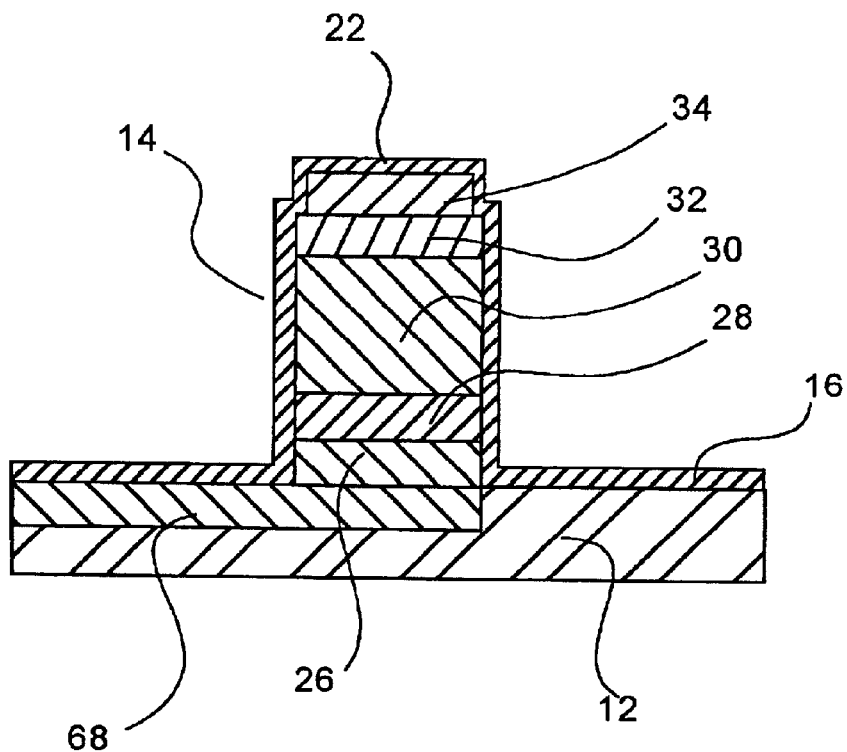
FIG. 15 is another cross-sectional view of the third embodiment.
Figure 16:
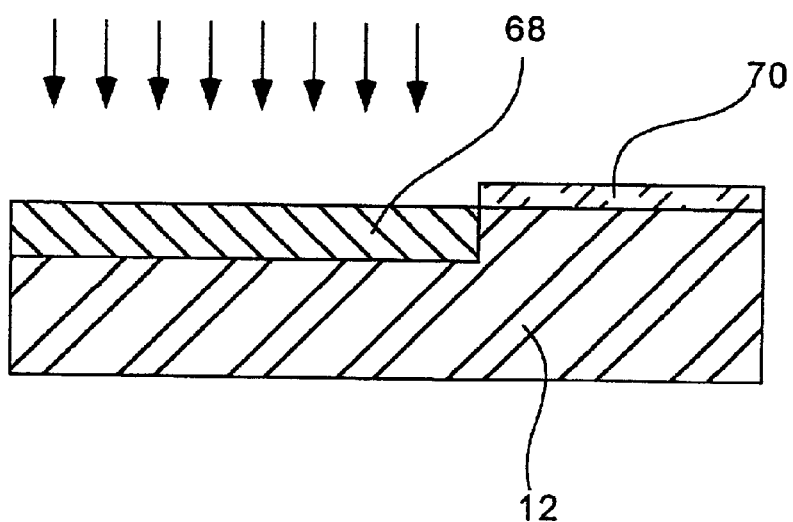
FIG. 16 is a cross-sectional view of an optical modulator element in the third embodiment as fabricated in one step.

FIG. 13 is a perspective view of an optical modulator practiced as the third embodiment of the invention. FIG. 14 is a cross-sectional view taken on line XIV—XIV in FIG. 13. FIG. 15 is another cross-sectional view taken on line XV—XV in FIG. 13.

In FIGS. 13, 14 and 15, reference numeral 66 denotes an optical modulator, and 68 represents an n-InP layer acting as the conductive layer. The n-InP layer 68 is arranged to occupy about half of the InP substrate 12. On the n-InP layer 68 is disposed an optical waveguide ridge 14. One side of the optical waveguide ridge 14 is in contact with an exposed surface 12a of the InP substrate 12 and another side of the ridge 14 is contacted with an exposed surface of the n-InP layer 68.

A p-type electrode 22 is extended from the top surface of the optical waveguide ridge 14 to the side in contact with the exposed surface 12a of the InP substrate 12. The p-type electrode 22 is further extended over a ridge surface protective film 16 onto the exposed surface 12a of the InP substrate 12 where an end of the electrode 22 is established as a bonding pad 22a.

The n-type electrode is formed through an opening 20 on the exposed surface of the n-InP layer 68.

An inventive method for fabricating the optical modulator 66 will now be described. FIGS. 16, 17, 18, 19 and 20 are cross-sectional views of an optical modulator element as fabricated in different steps.

An insulating film such as an SiO2 film is first formed over the surface of the InP substrate 12. A mask pattern 70 is produced by removing the insulating film from the region where the n-InP layer 68 is to be provided. With the mask pattern 70 used as a mask, the InP substrate 12 is gouged by etching to form a furrowed portion. The mask pattern 70 is then used as a selective growth mask through which to form the n-InP layer 68 by buried growth (see FIG. 16).

Figure 17:
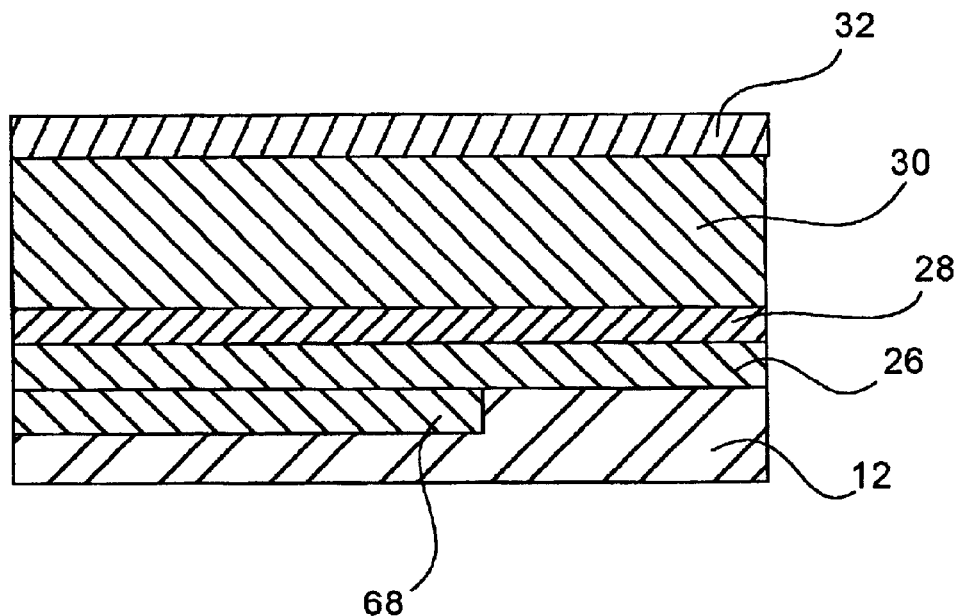
FIG. 17 is a cross-sectional view of the inventive optical modulator element as fabricated in another step.
Figure 18:
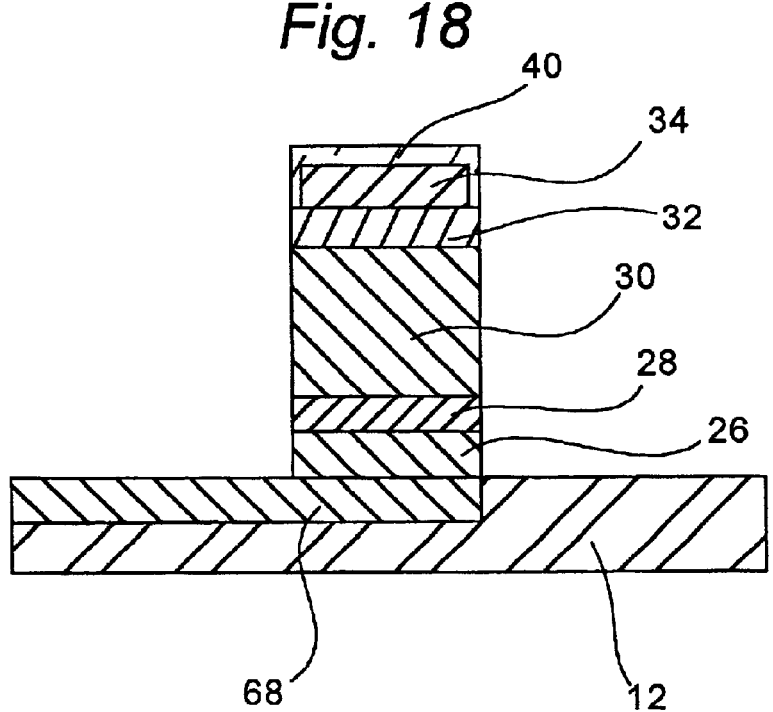
FIG. 18 is a cross-sectional view of the inventive optical modulator element as fabricated in another step.

On the InP substrate 12, there are formed by epitaxial growth an n-InP layer constituting an n-type clad layer 26, an optical absorption layer 28 having an MQW structure made of InGaAsP/InGaAs(P) materials, a p-InP layer forming a p-type clad layer 30, and a p-InGaAs layer serving as a contact layer 32 (see FIG. 17).

A coat of resist is applied onto the whole surface. By a process of photolithography, a resist pattern 38 is formed having a stripe-shaped opening 2 to 3 microns wide in the direction of the optical waveguide. On the resist pattern 38, Ti, Pt and Au layers are deposited by sputtering to form a foundation electrode layer 34. The resist pattern 38 is then removed by the lift-off method in a manner leaving the stripe-shaped foundation electrode layer 34 intact. A dielectric film such as an SiO2 film is formed anew to cover the stripe-shaped foundation electrode layer 34. While the pattern of the stripe-shaped dielectric film 40 including the foundation electrode layer 34 is left intact, the remaining portions are removed by etching. With the dielectric film 40 used as a ridge-forming mask, the layers are removed by dry etching in such a manner that the InP substrate 12 is exposed on one side of the ridge 14 while the n-InP layer is exposed on the other side of the ridge 14 (see FIG. 18).

Figure 19:
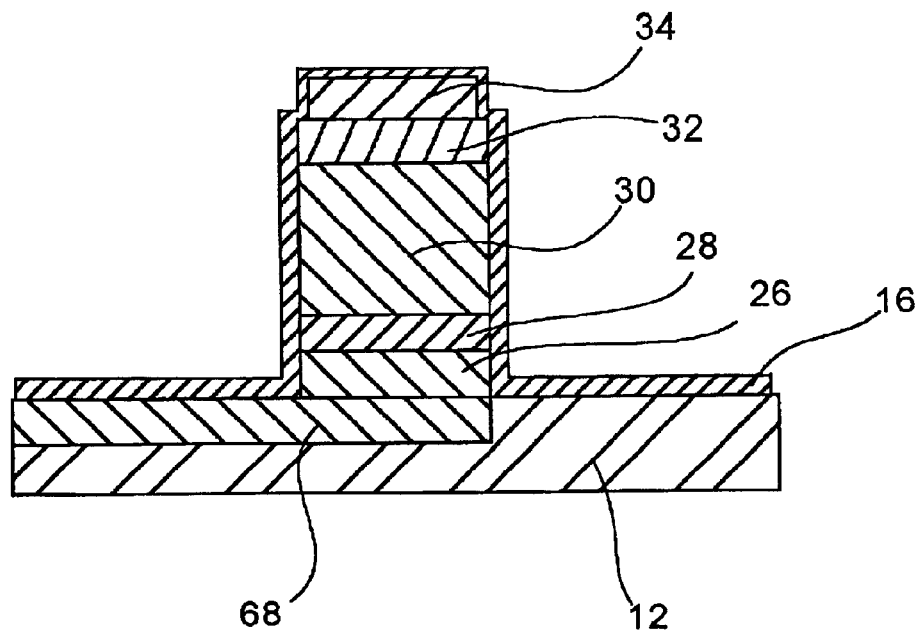
FIG. 19 is a cross-sectional view of the inventive optical modulator element as fabricated in another step.
Figure 20:
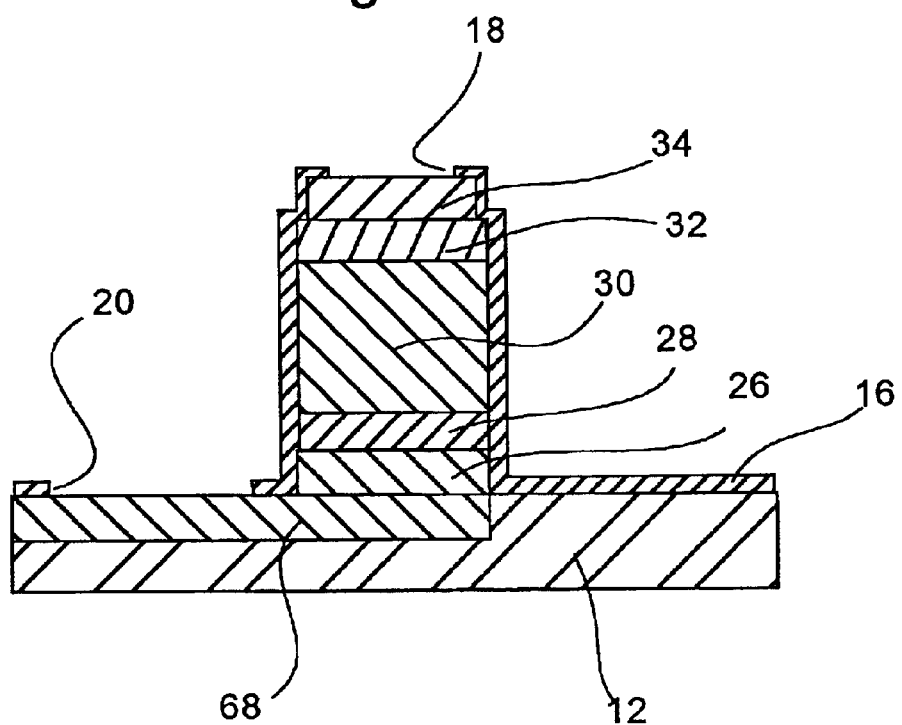
FIG. 20 is a cross-sectional view of the inventive optical modulator element as fabricated in another step.

A SiO2 film constituting the surface protective film 16 is then formed over the n-InP layer 68, optical waveguide ridge 14, and InP substrate 12 (see FIG. 19). Through the surface protective film 16, the openings 18 and 20 are formed on the top surface of the optical waveguide ridge 14 and on the n-InP layer 68 (see FIG. 20). Thereafter, a coat of resist is applied onto the surface protective film 16. A resist pattern is formed by removing the resist from a region covering the opening 20 as well as from a region that stretches from the top surface of the optical waveguide ridge 14 covering the opening 18 to the base of the ridge 14 by way of the lateral flat portion 14a and which extends further onto an exposed surface 58 of the InP substrate 12. All over the surface, a Ti film and an Au film are deposited as electrode layers by sputtering. By use of the lift-off method, the resist pattern and the electrode layers formed thereon are removed.

The steps above form the p-type electrode 22 which connects to the foundation electrode layer 34 through the opening 18, which stretches over the lateral flat portion 14a from the top surface of the optical waveguide ridge 14 to its bottom while in close contact with the surface protective film 16, and which extends further over the surface protective film 16 to the exposed surface of the InP substrate 12 where one end of the electrode 22 is established as the bonding pad 22a. The same steps fabricate the n-type electrode 24, one end of which is formed as a bonding pad in the region that includes the opening 20. The InP substrate 12 is then ground to a thickness of 100 μm, which completes the optical modulator element shown in FIGS. 13, 14 and 15.

According to the method above for fabricating the optical modulator 66, there is no need to form the extension 26a of the n-type clad layer 26 used as the conductive layer. That is, during fabrication of the optical waveguide ridge 14, there is no need to leave intact the n-type clad layer 26 and then remove that portion of the n-type clad layer 26 in which the p-type electrode 22 is furnished. The optical modulator element is thus made easier to fabricate than before.

In the optical modulator 66, the exposed surface of the InP substrate 12 is furnished only on one side of the optical waveguide ridge 14. Alternatively, flat portions in which to grow layers in a buried manner may be provided so that exposed surfaces of the InP substrate 12 will remain on both sides of the optical waveguide ridge 14. As in the optical modulator 56 of the second embodiment, the p-type electrode 22 may be brought into contact with the foundation electrode layer 34 through the opening 18. The p-type electrode 22 may be extended over the both flat portions 14a from the top surface of the optical waveguide ridge 14 to its base while in close contact with the surface protective film 16. The electrode 22 may be further extended over the surface protective film 16 on both sides of the optical waveguide ridge 14 onto the exposed surfaces of the InP substrate 12 in such a manner that one end of the electrode 22 may be formed as the bonding pad 22a and the other end as the edge 22b. In such a structure, a somewhat coarse alignment of the mask for fabricating the p-type electrode 22 does not increase the element capacity of the optical modulator. With element capacity variations thus reduced, the yield of optical modulator production is improved accordingly. This translates into a lowered manufacturing cost of the optical modulator.

Although the third embodiment above was shown having its n-InP layer formed by buried growth, this is not limitative of the invention. Alternatively, the n-InP layer may be fabricated more simply by having an n-type dopant such as Si or S ions implanted or diffused in the substrate. This permits fabrication of a less costly optical modulator.

Fourth Embodiment

Figure 21:
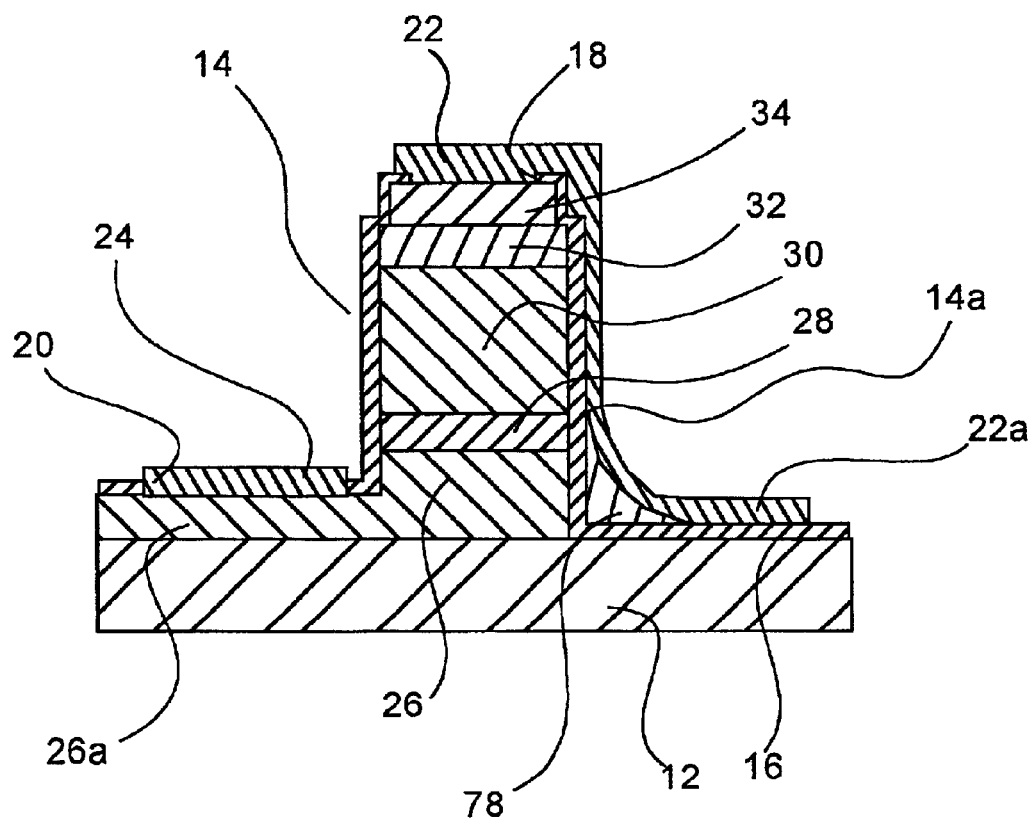
FIG. 21 is a cross-sectional view of an optical modulator practiced as a fourth embodiment of the invention.

The fourth embodiment of this invention is formed by having a dielectric furnished at a base of an optical waveguide ridge and between a surface protective film and a p-type electrode. FIG. 21 is a cross-sectional view of an optical modulator practiced as the fourth embodiment of the invention. The cross-section corresponds illustratively to that taken on line II—II in FIG. 1. Except for the presence of the dielectric, the fourth embodiment is structurally the same as the optical modulator 10 of the first embodiment.

In FIG. 21, reference numeral 78 denotes SOG (spin-on glass) provided as the dielectric. The SOG 78 may be replaced illustratively by polyimide.

A p-type electrode is provided laterally on an optical waveguide ridge 16 over a surface protective film 16. If it is assumed that an n-type clad layer 26 is 1 μm thick, that a p-type electrode 22 is 10 μm wide, and that the surface protective film 16 is 0.2 μm in thickness, then the region where the p-type electrode 22 is positioned opposite to the n-type clad layer 26 across the surface protective film 16 has a capacity of about 5 fF, which is far from negligible.

The flaw may be bypassed by rotatively applying a dielectric substance such as SOG onto the element after the optical waveguide ridge 14 is formed and covered with the surface protective film 16. The SOG 78 is thus furnished over the surface protective film 16 at the base of the optical waveguide ridge 14.

Interposing the SOG 78 between the surface protective film 16 and the p-type electrode 22 increases the distance between pole plates of a capacitor structure formed by the region of interest. This arrangement lowers the capacity of the region, which in turn reduces the element capacity and contributes to improving high-speed characteristics of the optical modulator.

Although the feature of the fourth embodiment has been described in relation to the optical modulator 10 of the first embodiment, this is not limitative of the invention. The feature may also be applied to optical modulators of the other embodiments described so far and will still produce the same results.

Fifth Embodiment

Figure 22:
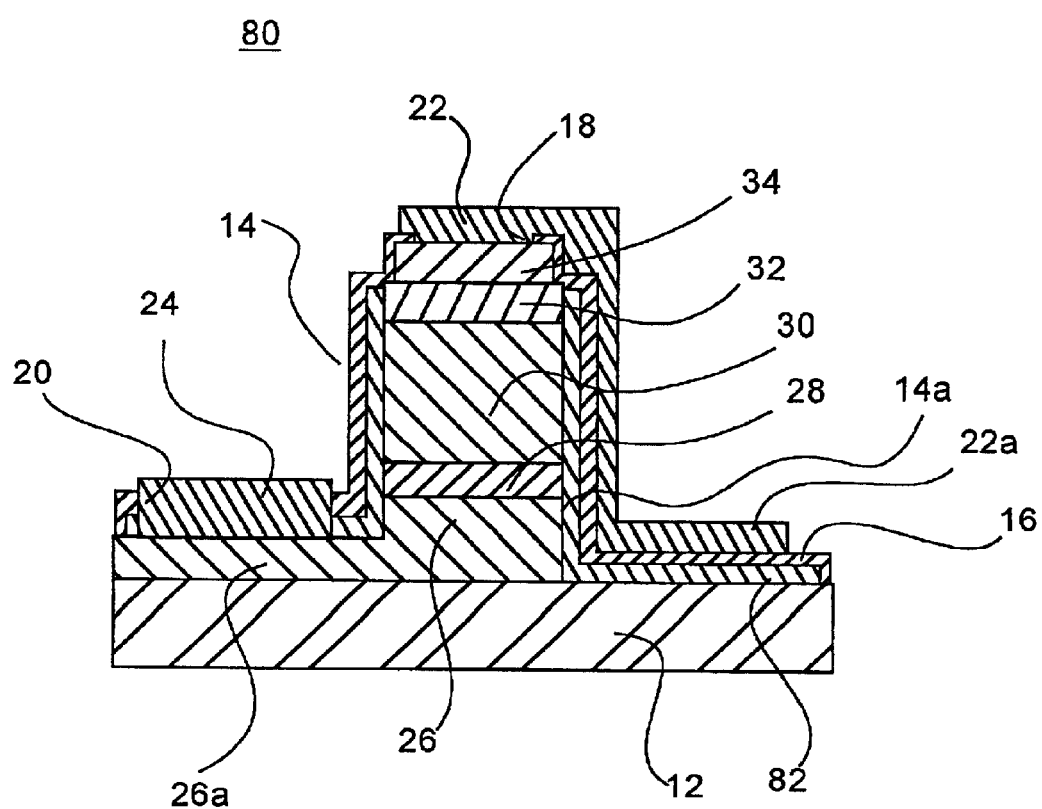
FIG. 22 is a cross-sectional view of an optical modulator practiced as a fifth embodiment of the invention.

The fifth embodiment of this invention is formed by installing a high-resistance semiconductor layer thinner than an optical waveguide ridge between one side of the ridge and a dielectric film. FIG. 22 is a cross-sectional view of an optical modulator practiced as the fifth embodiment of the invention. The cross-section corresponds illustratively to that taken on line II—II in FIG. 1. Except for the presence of the high-resistance semiconductor layer, the fifth embodiment is structurally the same as the optical modulator 10 of the first embodiment.

In FIG. 22, reference numeral 80 denotes an optical modulator, and 82 represents an Fe-doped InP layer acting as the high-resistance semiconductor layer. The Fe-doped InP layer 82 is formed as a protective layer furnished laterally over the optical waveguide ridge. The layer 82 has a thickness not in excess of that of the optical waveguide ridge in the optical modulator, illustratively between 0.01 μm and 0.3 μm and preferably between 0.01 μm and 0.1 μm.

The optical modulator of the fifth embodiment, as with the embodiments described so far, does not include a high-resistance layer thicker than the optical waveguide ridge 14 along any of its sides. In the optical modulator element, light is contained crosswise by a difference in refractive index between the substance constituting the optical waveguide ridge 14 and a space surrounding it. If the Fe-doped InP layer 82 is thinner than the optical modulator ridge 14 but in excess of 0.3 μm in thickness, the laser beam may become unstable in shape. The flaw is circumvented by furnishing an Fe-doped InP layer 82 that is significantly less in thickness than the ridge of the optical modulator. The structure helps protect the optical waveguide ridge 14 and improves its reliability.

Although the feature of the fifth embodiment has been described in relation to the optical modulator 10 of the first embodiment, this is not limitative of the invention. The feature may also be applied to optical modulators of the other embodiments described so far and will still provide the same results.

Sixth Embodiment

Figure 23:
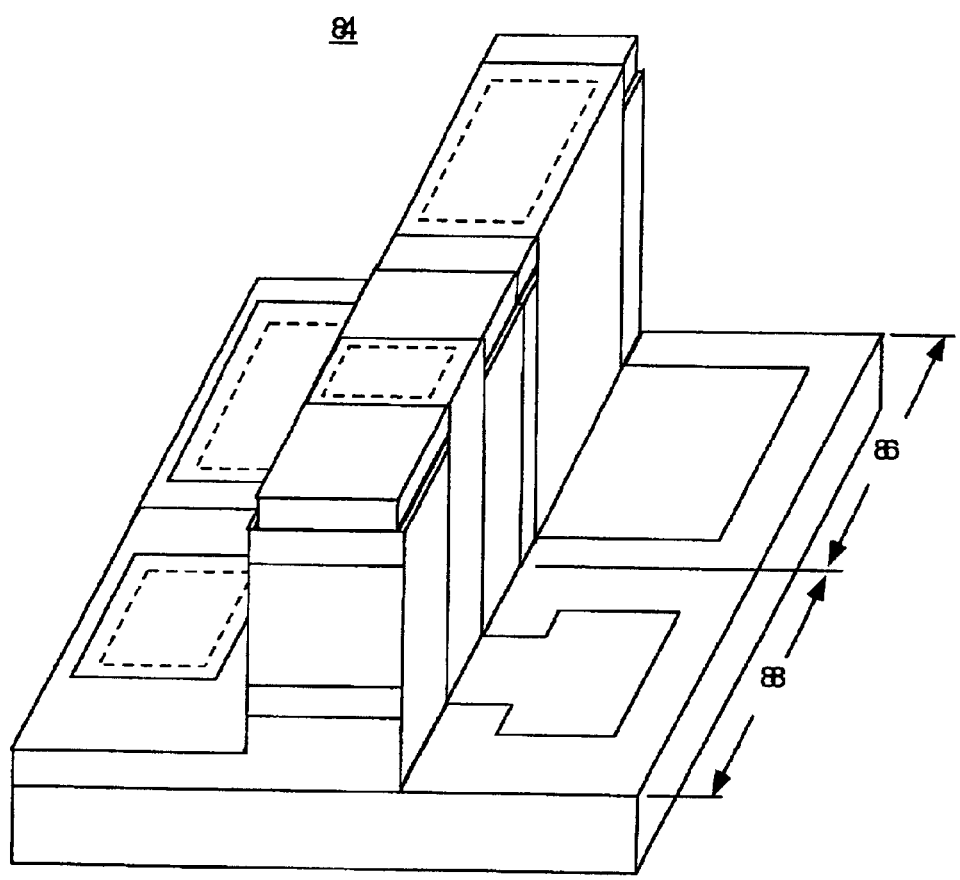
FIG. 23 is a perspective view of a semiconductor laser device having an optical modulator and practiced as a sixth embodiment of the invention.

The sixth embodiment of this invention constitutes a semiconductor laser device equipped with an inventive optical modulator, both devices being mounted on the same substrate. FIG. 23 is a perspective view of a semiconductor laser device having an optical modulator and practiced as the sixth embodiment of the invention. In FIG. 23, reference numeral 84 stands for a semiconductor laser device furnished with an optical modulator; 86 for a DFB type laser diode; and 88 for an optical modulator.

The optical modulator 88 and DFB type laser diode 86 are mounted on a common InP substrate 12 to form an optical modulator-equipped semiconductor laser device. An optical absorption layer 28 and an active layer (not shown) of the DFB type laser diode 86 are aligned along the same optical axis in the optical modulator 88. Implementing the optical modulator 88 using any one of the first through the fifth embodiments discussed above provides an optical modulator-equipped semiconductor laser device that offers excellent high-speed characteristics.

Figure 24:
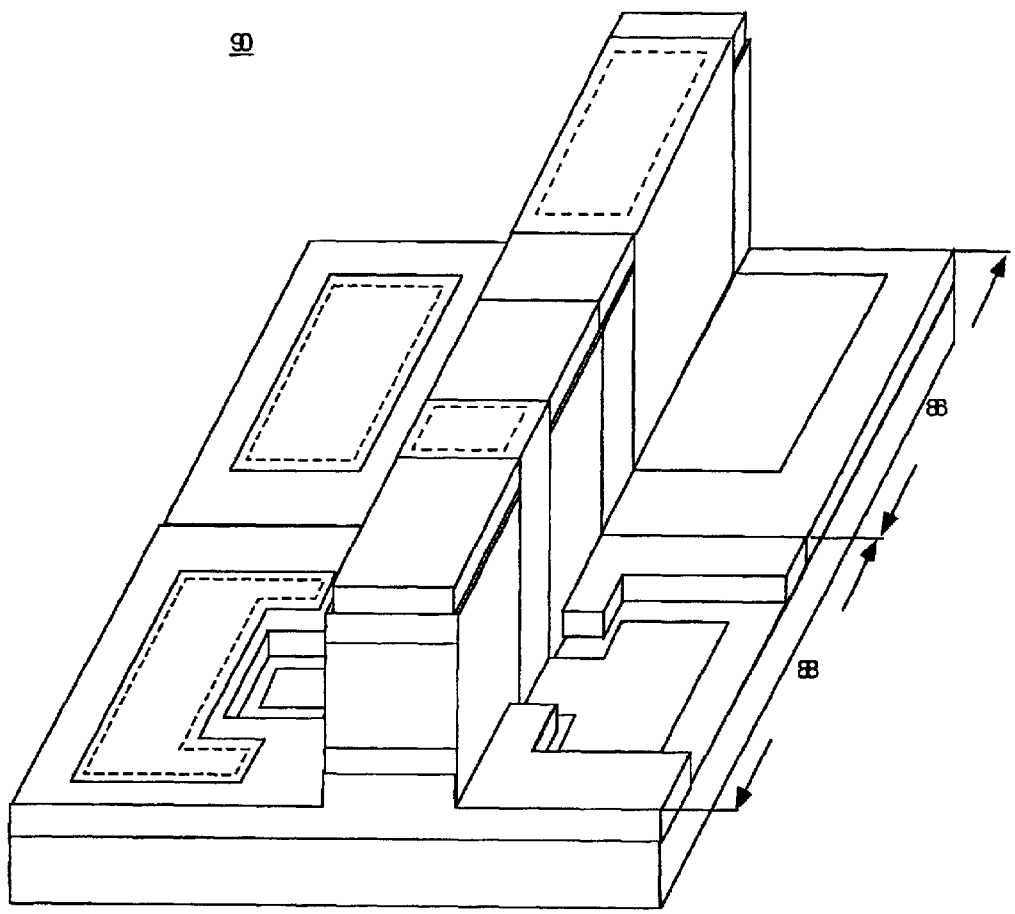
FIG. 24 is a perspective view of one variation of the sixth embodiment.
Figure 25:
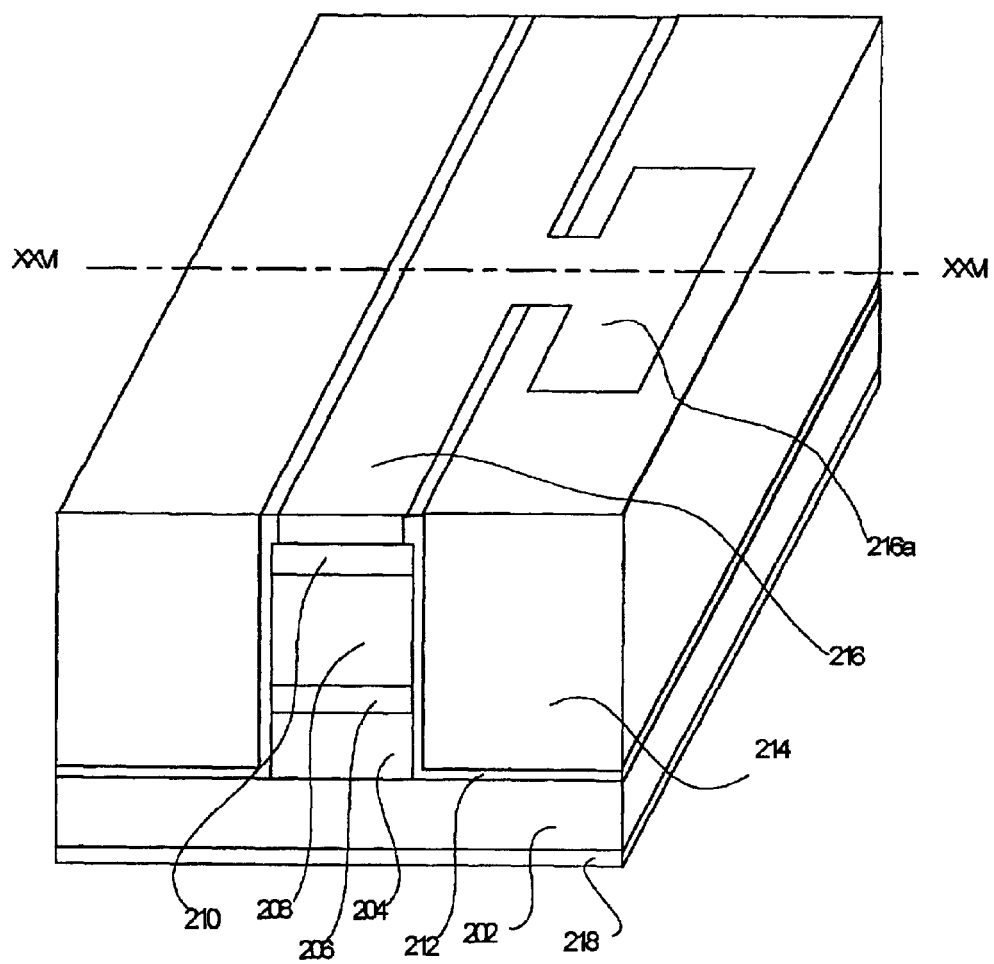
FIG. 25 is a perspective view of a conventional optical modulator.
Figure 26:
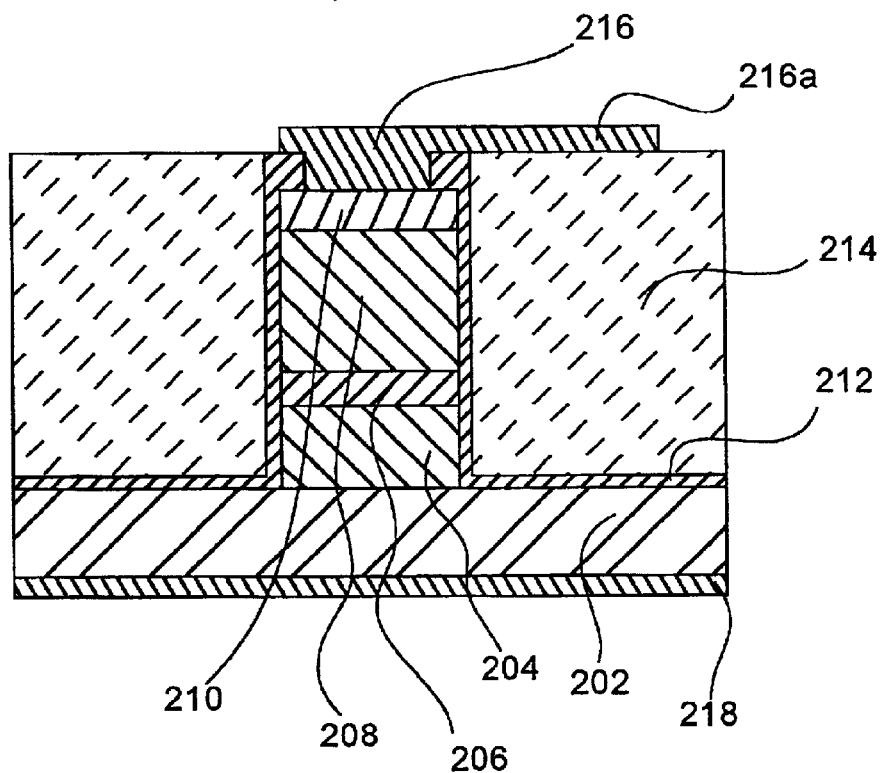
FIG. 26 is a cross-sectional view of the conventional optical modulator.
Figure 27:
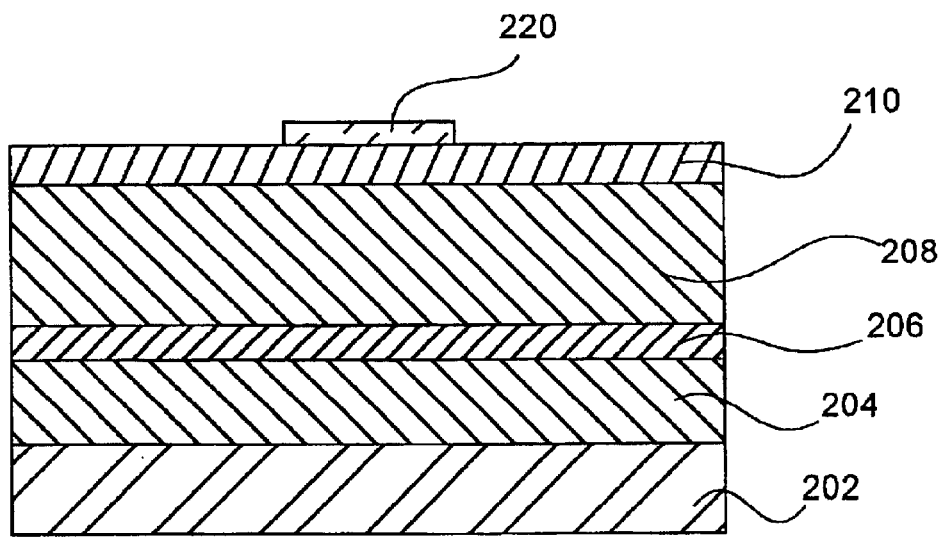
FIG. 27 is a cross-sectional view of the conventional optical modulator as fabricated in one step.
Figure 28:
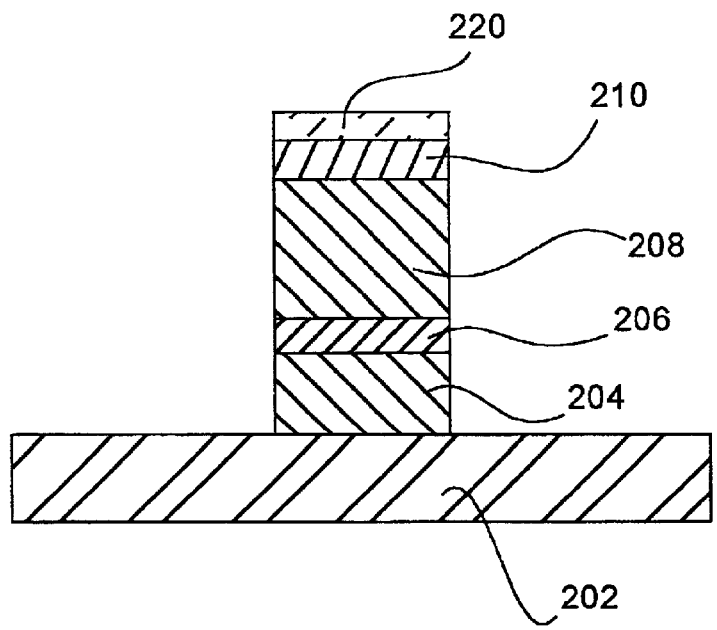
FIG. 28 is a cross-sectional view of the conventional optical modulator as fabricated in another step.
Figure 29:
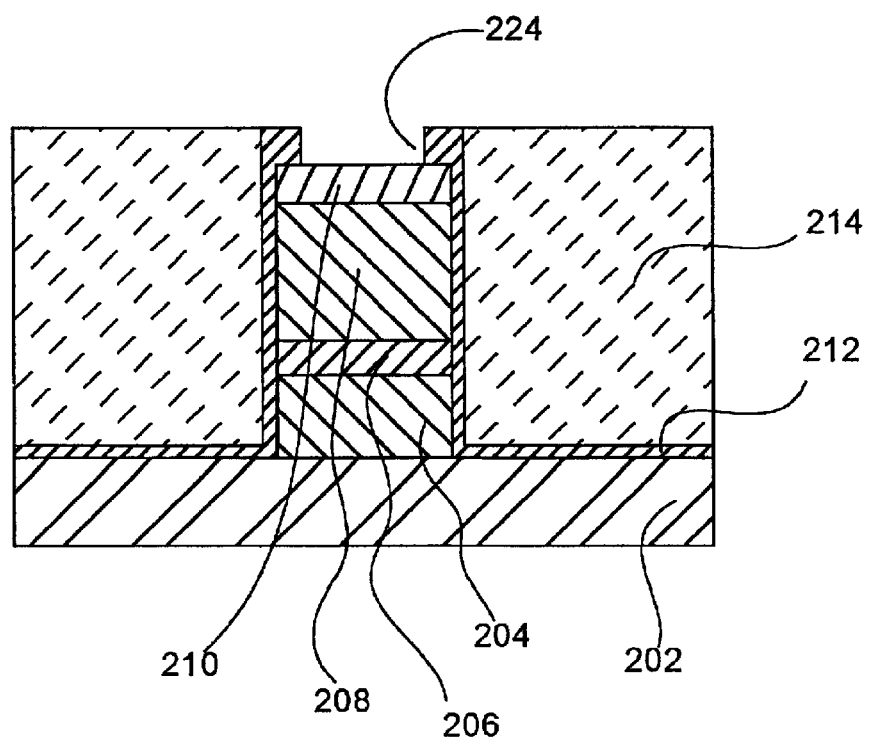
FIG. 29 is a cross-sectional view of the conventional optical modulator as fabricated in another step.

The optical modulator-equipped semiconductor laser device of the sixth embodiment has a monolithic structure constituting a photonic semiconductor device that is small-sized and highly reliable. The optical modulator-equipped semiconductor laser device 84 depicted in FIG. 23 is fabricated by use of the optical modulator 10 of the first embodiment. FIG. 24 is a perspective view of one variation of the sixth embodiment shown in FIG. 23.

In FIG. 24, reference numeral 90 stands for an optical modulator-equipped semiconductor laser device; 86 for a DFB type laser diode; and 88 for an optical modulator. The optical modulator-equipped semiconductor laser device 90 illustrated in FIG. 24 is constituted by use of the optical modulator 56 of the second embodiment. This variation of the sixth embodiment also acts as an optical modulator-equipped semiconductor laser device that provides outstanding high-speed characteristics.

Although the optical modulator and semiconductor laser device above were shown mounted integrally on a common substrate, this is not limitative of the invention. Alternatively, the two devices may be separately fabricated and then put together on an assembling board with their optical axes suitably aligned, and the effects are still the same.

To sum up, the inventive optical modulator and photonic semiconductor device of the above-described structures, and the inventive method for fabricating the optical modulator in the above-described steps provide the following major benefits:

According to one aspect of the invention, there is provided an optical modulator comprising: a semi-insulating semiconductor substrate with a principal plane partially including an exposed surface; an optical waveguide ridge which is disposed on said semiconductor substrate and which includes a first clad layer of a first conductivity type, an optical-absorption layer, and a second clad layer of a second conductivity type, said optical waveguide ridge further having a side with a flat portion extending uniformly from a top of the ridge to said semiconductor substrate, the flat portion being in contact with the exposed surface of said semiconductor substrate; a dielectric film which covers said optical waveguide ridge and said semiconductor substrate and which has a first opening made at the top of said optical waveguide ridge and a second opening made in a region of said semiconductor substrate other than the exposed surface; a first electrode disposed on said dielectric film and mounted through said first opening on the top of said optical waveguide ridge, said first electrode further extending on the flat portion of said optical waveguide ridge while in close contact with a surface of said dielectric film, said first electrode further having one end thereof established on said semiconductor substrate through the exposed surface thereof; and a second electrode disposed on said semiconductor substrate and connected to the first clad layer through the second opening of said dielectric film. The inventive structure reduces the capacity of the bonding pad of the first electrode, whereby an optical modulator of excellent high-speed performance is constituted.

In one preferred structure according to the invention, the semiconductor substrate has exposed surfaces on both sides of said optical waveguide ridge, the optical waveguide ridge has the flat portion on both sides thereof respectively and the first electrode extends over both sides of said optical waveguide ridge, two ends of said first electrode being disposed respectively on the exposed surface of said semiconductor substrate. The preferred structure reduces capacity variations caused by the first electrode from one modulator element to another. This helps minimize element capacity variations and contributes to attaining an enhanced yield rate in optical modulator fabrication.

In another preferred structure according to the invention, the first clad layer further extends onto a region of the semiconductor substrate located outside the optical waveguide ridge and excluding the region where the first electrode is disposed. The preferred structure makes mask alignment easier in fabricating exposed surfaces of the semiconductor substrate, whereby an optical modulator is produced at reduced costs.

In a further preferred structure according to the invention, the second electrode may be disposed through the second opening on the extension of the first clad layer. This structure makes it easier to connect the second electrode to the first clad layer, whereby a simply structured optical modulator is provided.

In an even further preferred structure according to the invention, the optical modulator may further comprise a dielectric located between the dielectric film and the first electrode and at a base of the optical waveguide ridge including a region where the flat portion of the ridge is in contact with the exposed surface of the semiconductor substrate. The preferred structure reduces the electrical capacity produced between the first electrode and the first clad layer along one side of the optical waveguide ridge, thus lowering the element capacity as a whole. This constitutes an optical modulator of excellent high-speed characteristics.

In a still further preferred structure according to the invention, the optical modulator may further comprise a conductive layer of the first conductivity type furnished over a part of the semiconductor substrate including a region under the optical waveguide ridge and excluding the region where the first electrode is provided, the second electrode being formed on the semiconductor layer through the second opening of the dielectric film. This provides a simply structure optical waveguide ridge and thus helps constitute an inexpensive optical modulator.

In a yet further preferred structure according to the invention, the optical modulator may further comprise a high-resistance semiconductor layer located between one side of the optical waveguide ridge and the dielectric film, the high-resistance semiconductor layer being thinner than the optical waveguide ridge. The preferred structure reinforces protection of the surface of the optical waveguide ridge, whereby a highly reliable optical modulator is constituted.

According to another aspect of the invention, there is provided a photonic semiconductor device comprising: an optical modulator having; a semi-insulating semiconductor substrate with a principal plane partially including an exposed surface, an optical waveguide ridge which is disposed on the semiconductor substrate and which includes a first clad layer of a first conductivity type, an optical-absorption layer, and a second clad layer of a second conductivity type, the optical waveguide ridge further having a side with a flat portion extending uniformly from a top of the ridge to said semiconductor substrate, the flat portion being in contact with the exposed surface of the semiconductor substrate, a dielectric film which covers the optical waveguide ridge and the semiconductor substrate and which has a first opening made at the top of the optical waveguide ridge and a second opening made in a region of the semiconductor substrate other than the exposed surface, a first electrode disposed on the dielectric film and mounted through the first opening on the top of the optical waveguide ridge, the first electrode further extending on the flat portion of the optical waveguide ridge while in close contact with a surface of the dielectric film, the first electrode further having one end thereof established on the semiconductor substrate through the exposed surface thereof, and a second electrode disposed on said semiconductor substrate and connected to the first clad layer through the second opening of the dielectric; and a semiconductor laser device aligned in optical axis with the optical absorption layer of the optical modulator. The invention thus provides a photonic semiconductor device of outstanding high-frequency characteristics.

In one preferred structure of the photonic semiconductor device, the semiconductor laser device may be a ridge type device having an optical waveguide ridge disposed on a semi-insulating semiconductor substrate, the semiconductor laser device and the optical modulator being mounted on the same substrate. The arrangement constituting the photonic semiconductor device amounts to a monolithic structure that is small-sized and highly reliable.

According to a further aspect of the invention, there is provided an optical modulator fabricating method comprising the steps of: forming firstly a first clad layer of a first conductivity type, an optical absorption layer, and a second clad layer of a second conductivity type on a semi-insulating semiconductor substrate; forming secondly by photolithograpy and etching an exposed surface of the semiconductor substrate as well as an optical waveguide ridge which has a side with aflat portion stretching uniformly from a top of the ridge to the semiconductor substrate, the flat portion being brought into contact with the exposed surface of the semiconductor substrate; forming thirdly a dielectric film over the semiconductor substrate and a first and a second opening through the film, the first opening being made at the top of the optical waveguide ridge, the second opening being made in a region of the semiconductor substrate excluding the exposed surface thereof; forming fourthly a first electrode through the first opening on the top of the optical waveguide ridge in such a manner that the first electrode extends along the flat portion of the optical waveguide ridge while in close contact with a surface of the dielectric film, the first electrode further having one end thereof formed on the semiconductor substrate through the exposed surface thereof; and forming fifthly a second electrode connected to the first clad layer through the second opening of the dielectric film. The inventive method permits fabricating an optical modulator of a reduced element capacity using simplified steps, whereby an inexpensive optical modulator of excellent high-speed characteristics is provided.

In one preferred variation of the inventive method, the second step may include forming exposed surfaces of the semiconductor substrate on both sides of the optical waveguide ridge, as well as the flat portion respectively on both sides of the optical waveguide ridge, and the fourth step may include causing the first electrode to extend over both sides of the optical waveguide ridge, and having two ends of the first electrode formed respectively on exposed surfaces of the semiconductor substrate. This preferred method makes mask alignment easier in forming the first electrode and helps attain an improved yield rate in fabricating the optical modulator at reduced costs.

In another preferred variation of the inventive method, the first step may be preceded by the step of forming a conductive layer of the first conductivity type over part of the semi-insulating semiconductor substrate; the second step may include forming an exposed surface of the conductive layer while forming the exposed surface of the semiconductor substrate; and the fifth step may include forming the second electrode on the conductive layer through the second opening. The preferred method permits concurrently fabricating both the optical waveguide ridge and the regions in which to form the first and second electrodes. This simplifies the steps of element fabrication, whereby an inexpensive optical modulator is provided.

While the presently preferred embodiments of the present invention have been shown and described. It is to be understood these disclosures are for the purpose of illustration and that various changes and modifications may be made without departing from the scope of the invention as set forth in the appended claims.

The entire disclosure of a Japanese Patent Application No. 2000-337472, filed on Nov. 6, 2000 including specification, claims, drawings and summary, on which the Convention priority of the present application is based, are incorporated herein by reference in its entirety.

What is claimed is:

1. An optical modulator comprising:

a semi-insulating semiconductor substrate with a principal plane;

an optical waveguide ridge disposed on the principal plane of said semiconductor substrate and including a first cladding layer of a first conductivity type, an optical-absorption layer, and a second cladding layer of a second conductivity type, sequentially stacked on said semiconductor substrate, said optical waveguide ridge including a planar first side extending from a top of the said optical waveguide ridge to and contacting the principal plane of said semiconductor substrate, the first cladding layer having an extension protruding from said optical waveguide ridge and covering a part of the principal plane of said semiconductor substrate;

a dielectric film covering said optical waveguide ridge, the extension of the first cladding layer, and the principal plane of said semiconductor substrate not covered by the first cladding layer, said dielectric film having a first opening at the top of said optical waveguide ridge and a second opening opposite a region of the extension of the first cladding layer on a second side of said optical waveguide ridge, opposite the first side of said optical waveguide ridge;

a first electrode disposed on said dielectric film and extending through the first opening on the top of said optical waveguide ridge and making electric contact with said optical waveguide ridge, extending on the first side of said optical waveguide ridge in contact with a surface of said dielectric film, and including a bonding pad on said dielectric film directly opposite the principal plane of said semiconductor substrate at the first side of said optical waveguide ridge; and a second electrode making electrical contact with the first cladding layer through the second opening in said dielectric film.

2. The optical modulator according to claim 1, wherein said optical waveguide ridge is planar on the second side, said first electrode extends on said dielectric film on both the first and second sides of said optical waveguide ridge, and said first electrode includes an end disposed on said dielectric film opposite the principal surface of said semiconductor substrate at the second side of said optical waveguide ridge.

3. The optical modulator according to claim 2, wherein the extension of the first cladding layer extends from a part of the first side and from a second side of said optical waveguide ridge onto the principal plane of said semiconductor substrate.

4. The optical modulator according to claim 3, further comprising a dielectric layer located between said dielectric film and said first electrode and at a base of said optical waveguide ridge, including a region where the planar first side of said optical waveguide ridge is in contact with the principal plane of said semiconductor substrate.

5. The optical modulator according to claim 3, further comprising a high-resistance semiconductor layer located between the first side of said optical waveguide ridge and said dielectric film, said high-resistance semiconductor layer being thinner than said optical waveguide ridge.

6. The optical modulator according to claim 2, further comprising a dielectric layer located between said dielectric film and said first electrode and at a base of said optical waveguide ridge, including a region where the planar first side of said optical waveguide ridge is in contact with the principal plane of said semiconductor substrate.

7. The optical modulator according to claim 2, further comprising a high-resistance semiconductor layer located between the first side of said optical waveguide ridge and said dielectric film, said high-resistance semiconductor layer being thinner than said optical waveguide ridge.

8. The optical modulator according to claim 1, wherein the extension of the first cladding layer extends from a part of the first side and from a second side of said optical waveguide ridge onto the principal plane of said semiconductor substrate.

9. The optical modulator according to claim 8, further comprising a dielectric layer located between said dielectric film and said first electrode and at a base of said optical waveguide ridge, including a region where the planar first side of said optical waveguide ridge is in contact with the principal plane of said semiconductor substrate.

10. The optical modulator according to claims 8, further comprising a high-resistance semiconductor layer located between the first side of said optical waveguide ridge and said dielectric film, said high-resistance semiconductor layer being thinner than said optical waveguide ridge.

11. The optical modulator according to claim 1, further comprising a dielectric layer located between said dielectric film and said first electrode and at a base of said optical waveguide ridge, including a region where the planar first side of said optical waveguide ridge is in contact with the principal plane of said semiconductor substrate.

12. The optical modulator according to claim 1, further comprising a high-resistance semiconductor layer located between the first side of said optical waveguide ridge and said dielectric film, said high-resistance semiconductor layer being thinner than said optical waveguide ridge.

13. An optical modulator comprising:
a semi-insulating semiconductor substrate with a principal plane, said semiconductor substrate including an electrically conductive region of a first conductivity type exposed at a part of the principal plane of said semiconductor substrate;
an optical waveguide ridge disposed on the principal plane of said semiconductor substrate and on the electrically conductive region of said semiconductor substrate, said optical waveguide ridge including a first cladding layer of the first conductivity type in contact with the electric ally conductive region, an optical-absorption layer, and a second cladding layer of a second conductivity type, sequentially stacked on said semiconductor substrate, said optical waveguide ridge having a planar first side extending from a top of said optical waveguide ridge to and in contact with the principal plane of said semiconductor substrate;
a dielectric film covering said optical waveguide ridge and the principal plane of said semiconductor substrate, including a first opening at the top of said optical waveguide ridge and a second opening directly opposite a portion of the principal plane of said semiconductor substrate including said electrically conductive region;
a first electrode disposed on said dielectric film, extending through the first opening on the top of said optical waveguide ridge and making electrical contact with said optical waveguide ridge, extending on the first side of said optical waveguide ridge in contact with said dielectric film, and including a bonding pad on said dielectric film directly opposite the principal plane of said semiconductor substrate at the first side of said optical waveguide ridge; and
a second electrode making electrical contact with said electrically conductive region through the second opening in said dielectric film.

14. A photonic semiconductor device comprising:
an optical modulator having:
a semi-insulating semiconductor substrate with a principal plane;
an optical waveguide ridge disposed on the principal plane of said semiconductor substrate and including a first cladding layer of a first conductivity type, an optical-absorption layer, and a second cladding layer of a second conductivity type, sequentially stacked on said semiconductor substrate, said optical waveguide ridge including a planar first side extending from a top of said optical waveguide ridge to and contacting the principal plane of said semiconductor substrate, the first cladding layer having an extension protruding from said optical waveguide ridge and covering a part of the principal lane of said semiconductor substrate;
a dielectric film covering said optical waveguide ridge, the extension of the first cladding layer, and the principal plane of said semiconductor substrate not covered by the first cladding layer, said dielectric film having a first opening at the top of said optical waveguide ridge and a second opening opposite a region of the extension of the first cladding layer on a second side of said optical waveguide ridge, opposite the first side of said optical waveguide ridge;
a first electrode disposed on said dielectric film and extending through the first opening on the top of said optical waveguide ridge and making electric contact with said optical waveguide ridge, extending on the first side of said optical waveguide ridge in contact with a surface of said dielectric film, and including a bonding pad on said dielectric film directly opposite the principal plane of said semiconductor substrate at the first side of said optical waveguide ridge; and
a second electrode making electrical contact with the first cladding layer through the second opening in said dielectric film and
a semiconductor laser device aligned in optical axis with the optical absorption layer of said optical modulator.

15. The photonic semiconductor device according to claim 14, wherein said semiconductor laser device is a ridge type device having an optical waveguide ridge disposed on a semi-insulating semiconductor substrate, said semiconductor laser device and said optical modulator being mounted on said semiconductor substrate.

* * * * *